(12) United States Patent
Fukumori

(10) Patent No.: US 10,703,439 B2
(45) Date of Patent: Jul. 7, 2020

(54) BICYCLE SPROCKET

(71) Applicant: SHIMANO INC., Sakai (JP)

(72) Inventor: Tsuyoshi Fukumori, Sakai (JP)

(73) Assignee: SHIMANO INC., Sakai (JP)

( * ) Notice: Subject to any disclaimer, the term of this patent is extended or adjusted under 35 U.S.C. 154(b) by 423 days.

(21) Appl. No.: 15/493,089

(22) Filed: Apr. 20, 2017

(65) Prior Publication Data

US 2018/0304965 A1 Oct. 25, 2018

(51) Int. Cl.
*B62M 9/10* (2006.01)
*F16H 55/30* (2006.01)
*B62M 9/12* (2006.01)

(52) U.S. Cl.
CPC .............. *B62M 9/10* (2013.01); *F16H 55/30* (2013.01); *B62M 9/105* (2013.01); *B62M 9/12* (2013.01)

(58) Field of Classification Search
CPC .......... B62M 9/10; B62M 9/105; B62M 9/12; F16H 55/30
USPC .......................................................... 474/160
See application file for complete search history.

(56) References Cited

U.S. PATENT DOCUMENTS

| | | | |
|---|---|---|---|
| 5,192,249 A * | 3/1993 | Nagano | B62M 9/10 474/160 |
| 5,738,603 A * | 4/1998 | Schmidt | B62M 9/10 474/158 |
| 5,830,096 A | 11/1998 | Schmidt et al. | |
| 2004/0009838 A1 * | 1/2004 | Valle | B62M 9/105 474/160 |
| 2005/0079940 A1 * | 4/2005 | Reiter | B62M 9/10 474/160 |
| 2006/0154767 A1 * | 7/2006 | Kamada | B62M 9/10 474/160 |
| 2009/0258740 A1 * | 10/2009 | Valle | B62M 9/10 474/160 |
| 2011/0092327 A1 * | 4/2011 | Oishi | B62M 9/10 474/160 |
| 2013/0072334 A1 * | 3/2013 | Braedt | B62M 9/10 474/156 |
| 2013/0139642 A1 | 6/2013 | Reiter et al. | |
| 2015/0285358 A1 * | 10/2015 | Numata | F16H 55/08 474/160 |
| 2015/0362057 A1 * | 12/2015 | Wesling | F16H 55/06 474/152 |
| 2016/0059930 A1 * | 3/2016 | Fukunaga | B62M 9/10 474/160 |

(Continued)

*Primary Examiner* — Michael R Mansen
*Assistant Examiner* — Raveen J Dias
(74) *Attorney, Agent, or Firm* — Mori & Ward, LLP

(57) ABSTRACT

A bicycle sprocket comprises a sprocket body and a plurality of sprocket teeth provided on an outer periphery of the sprocket body and including at least one first tooth and at least one second tooth. The at least one first tooth has a driving surface side and a non-driving surface side. The at least one first tooth has a bevel cut shape in the non-driving surface side. The bevel cut shape is configured to avoid initially engaging with a bicycle chain in a shifting operation where the bicycle chain shifts from an adjacent smaller bicycle sprocket to the bicycle sprocket. The at least one second tooth is configured to initially engage with the bicycle chain in the shifting operation. The at least one second tooth is disposed adjacent to the at least one first tooth in a circumferential direction with respect to a rotational center axis of the bicycle sprocket.

21 Claims, 15 Drawing Sheets

(56) References Cited

U.S. PATENT DOCUMENTS

| | | | |
|---|---|---|---|
| 2016/0059931 A1* | 3/2016 | Fukunaga | B62M 9/10 |
| | | | 474/158 |
| 2016/0101825 A1* | 4/2016 | Braedt | B62M 9/12 |
| | | | 474/160 |
| 2016/0207590 A1* | 7/2016 | Fukumori | F16H 55/30 |
| 2016/0347409 A1* | 12/2016 | Watarai | B62M 9/02 |
| 2017/0029066 A1* | 2/2017 | Fukunaga | B62M 9/10 |
| 2017/0101159 A1* | 4/2017 | Watarai | B21K 23/00 |
| 2017/0146109 A1* | 5/2017 | Reiter | B62M 9/105 |

* cited by examiner

BICYCLE SPROCKET

BACKGROUND OF THE INVENTION

Field of the Invention

The present invention relates to a bicycle sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle sprocket.

SUMMARY OF THE INVENTION

In accordance with a first aspect of the present invention, a bicycle sprocket comprises a sprocket body and a plurality of sprocket teeth. The plurality of sprocket teeth are provided on an outer periphery of the sprocket body. The plurality of sprocket teeth includes at least one first tooth and at least one second tooth. The at least one first tooth has a driving surface side and a non-driving surface side. The at least one first tooth has a bevel cut shape in the non-driving surface side. The bevel cut shape is configured to avoid initially engaging with a bicycle chain in a shifting operation where the bicycle chain shifts from an adjacent smaller bicycle sprocket to the bicycle sprocket. The at least one second tooth is configured to initially engage with the bicycle chain in the shifting operation. The at least one second tooth is disposed adjacent to the at least one first tooth in a circumferential direction with respect to a rotational center axis of the bicycle sprocket.

With the bicycle sprocket according to the first aspect, it is possible to prevent an unintentional downshifting chain movement.

In accordance with a second aspect of the present invention, the bicycle sprocket according to the first aspect is configured so that the at least one first tooth has a non-driving surface to contact with an axially outer surface of a bicycle outer link plate of the bicycle chain before the at least one first tooth contacts an axially inner surface of the bicycle outer link plate in the shifting operation.

With the bicycle sprocket according to the second aspect, the at least one first tooth is likely to engage with the bicycle chain. Despite that, it is possible to prevent the unintentional downshifting chain movement.

In accordance with a third aspect of the present invention, the bicycle sprocket according to any one of the first and second aspects is configured so that the at least one first tooth has a bicycle outboard surface and a bicycle inboard surface opposite to the bicycle outboard surface in an axial direction with respect to the rotational center axis. The bicycle inboard surface faces a bicycle frame. The at least one first tooth has an axial recess in the bicycle outboard surface.

With the bicycle sprocket according to the third aspect, it is possible to further prevent the unintentional downshifting chain movement at a region (at the at least one first tooth) where the unintentional downshifting chain movement is likely to occur.

In accordance with a fourth aspect of the present invention, the bicycle sprocket according to any one of the first to third aspects is configured so that the at least one first tooth is configured to avoid initially engaging with the bicycle chain in the shifting operation.

With the bicycle sprocket according to the fourth aspect, it is possible to further prevent the unintentional downshifting chain movement.

In accordance with a fifth aspect of the present invention, the bicycle sprocket according to any one of the first to fourth aspects is configured so that the at least one second tooth is disposed adjacent to the at least one first tooth at a downstream side in a driving rotational direction of the bicycle sprocket.

With the bicycle sprocket according to the fifth aspect, it is possible to further prevent the unintentional downshifting chain movement at the region (at the at least one first tooth at the downstream side) where the unintentional downshifting chain movement is likely to occur.

In accordance with a sixth aspect of the present invention, the bicycle sprocket according to any one of the first to fifth aspects is configured so that the at least one second tooth is disposed adjacent to the at least one first tooth at an upstream side in a driving rotational direction of the bicycle sprocket.

With the bicycle sprocket according to the sixth aspect, it is possible to further prevent the unintentional downshifting chain movement at the region (at the at least one first tooth at the upstream side) where the unintentional downshifting chain movement is likely to occur.

In accordance with a seventh aspect of the present invention, the bicycle sprocket according to any one of the first to sixth aspects is configured so that the at least one first tooth has a bicycle outboard surface and a bicycle inboard surface opposite to the bicycle outboard surface in an axial direction with respect to the rotational center axis. The bicycle inboard surface faces a bicycle frame. The at least one first tooth has an inboard chamfer in the bicycle inboard surface.

With the bicycle sprocket according to the seventh aspect, the inboard chamfer facilitates a downshifting operation when the rider performs the downshifting operation.

In accordance with an eighth aspect of the present invention, the bicycle sprocket according to any one of the first to seventh aspects is configured so that the at least one first tooth has a non-driving surface including a concave curved surface.

With the bicycle sprocket according to the eighth aspect, it is possible to further prevent the unintentional downshifting chain movement.

In accordance with a ninth aspect of the present invention, the bicycle sprocket according to any one of the first to seventh aspects is configured so that the at least one first tooth has a non-driving surface including a plurality of concave curved surfaces.

With the bicycle sprocket according to the ninth aspect, it is possible to further prevent the unintentional downshifting chain movement.

In accordance with a tenth aspect of the present invention, a bicycle sprocket comprises a sprocket body and a plurality of sprocket teeth. The plurality of sprocket teeth are provided on an outer periphery of the sprocket body. The plurality of sprocket teeth includes at least one first tooth and at least one second tooth. The at least one first tooth has a driving surface and a non-driving surface. The non-driving surface is opposite to the driving surface in a circumferential direction with respect to a rotational center axis of the bicycle sprocket. The non-driving surface includes a first non-driving surface portion and a second non-driving surface portion so that a ridge is formed between the first non-driving surface portion and the second non-driving surface portion. The at least one second tooth is configured to initially engage with the bicycle chain in a shifting operation where the bicycle chain shifts from an adjacent smaller bicycle sprocket to the bicycle sprocket. The at least one second tooth is disposed adjacent to the at least one first tooth in a circumferential direction with respect to a rotational center axis of the bicycle sprocket.

With the bicycle sprocket according to the tenth aspect, a roller of the bicycle chain can run on the ridge before the at least one first tooth contacts a chamfer of a link plate of the bicycle chain to prevent the unintentional downshifting chain movement as well as to maintain strength of the at least one first tooth.

In accordance with an eleventh aspect of the present invention, the bicycle sprocket according to the tenth aspect is configured so that the at least one first tooth has a bicycle outboard surface and a bicycle inboard surface opposite to the bicycle outboard surface in an axial direction with respect to the rotational center axis. The bicycle inboard surface faces a bicycle frame. The at least one first tooth has an axial recess in the bicycle outboard surface.

With the bicycle sprocket according to the eleventh aspect, it is possible to further prevent the unintentional downshifting chain movement at a region (at the at least one first tooth) where the unintentional downshifting chain movement is likely to occur.

In accordance with a twelfth aspect of the present invention, the bicycle sprocket according to any one of the tenth and eleventh aspects is configured so that the first non-driving surface portion is disposed radially outwardly from the second non-driving surface portion. The non-driving surface has an outboard chamfer adjacent to at least one of the first non-driving surface portion and the second non-driving surface portion.

With the bicycle sprocket according to the twelfth aspect, the roller of the bicycle chain can run on the ridge and/or the outboard chamfer before the at least one first tooth contacts the chamfer of the link plate of the bicycle chain further to prevent the unintentional downshifting chain movement as well as to maintain strength of the at least one first tooth. Further, it further restrains the bicycle chain from being worn out.

In accordance with a thirteenth aspect of the present invention, the bicycle sprocket according to the twelfth aspect is configured so that the outboard chamfer is disposed adjacent to the second non-driving surface portion.

With the bicycle sprocket according to the thirteenth aspect, the roller of the bicycle chain can run on the ridge and/or the outboard chamfer before the at least one first tooth contacts the chamfer of the link plate of the bicycle chain further to prevent the unintentional downshifting chain movement as well as to maintain strength of the at least one first tooth. Further, it further restrains the bicycle chain from being worn out.

In accordance with a fourteenth aspect of the present invention, the bicycle sprocket according to any one of the twelfth and thirteenth aspects is configured so that the at least one first tooth further has a bicycle outboard surface and a bicycle inboard surface opposite to the bicycle outboard surface in an axial direction with respect to the rotational center axis. The driving surface and the non-driving surface are disposed between the bicycle outboard surface and the bicycle inboard surface in the axial direction. The outboard chamfer is provided between the bicycle outboard surface and at least one of the first non-driving surface portion and the second non-driving surface portion.

With the bicycle sprocket according to the fourteenth aspect, the roller of the bicycle chain can run on the ridge and/or the outboard chamfer before the at least one first tooth contacts the chamfer of the link plate of the bicycle chain further to prevent the unintentional downshifting chain movement as well as to maintain strength of the at least one first tooth. Further, it further restrains the bicycle chain from being worn out.

In accordance with a fifteenth aspect of the present invention, the bicycle sprocket according to any one of the tenth to fourteenth aspects is configured so that the at least one first tooth is configured to avoid initially engaging with the bicycle chain in the shifting operation.

With the bicycle sprocket according to the fifteenth aspect, the at least one first tooth is further configured to prevent the unintentional downshifting chain movement as well as to maintain strength of the at least one first tooth. Further, it further restrains the bicycle chain from being worn out.

In accordance with a sixteenth aspect of the present invention, the bicycle sprocket according to any one of the tenth to fifteenth aspects is configured so that the at least one second tooth is disposed adjacent to the at least one first tooth at a downstream side in a driving rotational direction of the bicycle sprocket.

With the bicycle sprocket according to the sixteenth aspect, the at least one first tooth and the at least one second tooth are further configured to prevent the unintentional downshifting chain movement as well as to maintain strength of the at least one first tooth. Further, it further restrains the bicycle chain from being worn out.

In accordance with a seventeenth aspect of the present invention, the bicycle sprocket according to any one of the tenth to sixteenth aspects is configured so that the at least one second tooth is disposed adjacent to the at least one first tooth at an upstream side in a driving rotational direction of the bicycle sprocket.

With the bicycle sprocket according to the seventeenth aspect, the at least one first tooth and the at least one second tooth are further configured to prevent the unintentional downshifting chain movement as well as to maintain strength of the at least one first tooth. Further, it further restrains the bicycle chain from being worn out.

In accordance with an eighteenth aspect of the present invention, the bicycle sprocket according to any one of the tenth to seventeenth aspects is configured so that the at least one first tooth has a bicycle outboard surface and a bicycle inboard surface opposite to the bicycle outboard surface in an axial direction with respect to the rotational center axis. The bicycle inboard surface faces a bicycle frame. The at least one first tooth has an inboard chamfer in the bicycle inboard surface.

With the bicycle sprocket according to the eighteenth aspect, the inboard chamfer facilitates a downshifting operation when the rider performs the downshifting operation.

In accordance with a nineteenth aspect of the present invention, a bicycle sprocket includes a sprocket body and a plurality of sprocket teeth provided on an outer periphery of the sprocket body. The plurality of sprocket teeth includes at least one first tooth. The at least one first tooth has a driving surface and a non-driving surface opposite to the driving surface in a circumferential direction with respect to a rotational center axis of the bicycle sprocket. A reference line extends in a radial direction with respect to a rotational center axis of the bicycle sprocket to pass through the rotational center axis. A first angle made by the reference line and a non-driving side inclination reference line defined on the non-driving surface is larger than 36 degrees.

With the bicycle sprocket according to the nineteenth aspect, it is possible to prevent the unintentional downshifting chain movement.

In accordance with a twentieth aspect of the present invention, the bicycle sprocket according to the nineteenth aspect is configured so that a second angle made by the reference line and a driving side inclination reference line defined on the driving surface is larger than 8 degrees.

With the bicycle sprocket according to the twentieth aspect, it is possible to further prevent the unintentional downshifting chain movement.

In accordance with a twenty-first aspect of the present invention, the bicycle sprocket according to any one of the nineteenth and twentieth aspects is configured so that the non-driving surface includes a first non-driving surface portion and a second non-driving surface portion so that a ridge is formed between the first non-driving surface portion and the second non-driving surface portion. The first non-driving surface portion is disposed radially outwardly from the second non-driving surface portion. The non-driving side inclination line is defined on the first non-driving surface portion.

With the bicycle sprocket according to the twenty-first aspect, it is possible to further prevent the unintentional downshifting chain movement at a region (at the at least one first tooth) where the unintentional downshifting chain movement is likely to occur.

In accordance with a twenty-second aspect of the present invention, the bicycle sprocket according to any one of the nineteenth and twenty-first aspects is configured so that the reference line extends from a tooth center of the at least one first tooth in the circumferential direction to the rotational center axis of the bicycle sprocket such that the reference line is perpendicular to the rotational center axis.

With the bicycle sprocket according to the twenty-second aspect, it is possible to further prevent the unintentional downshifting chain movement.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
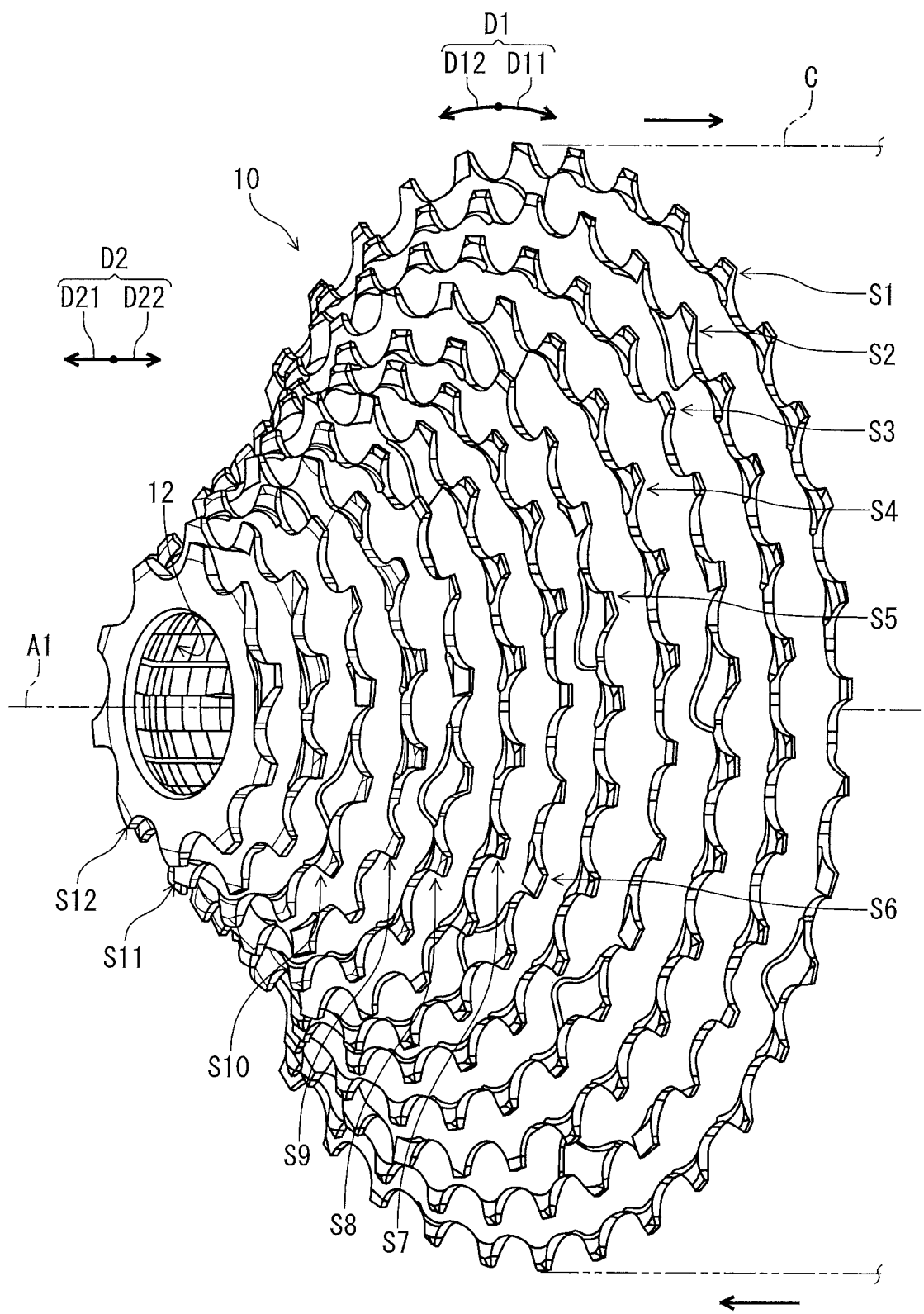
FIG. 1 is a perspective view of a bicycle multiple sprocket assembly including a bicycle sprocket in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle multiple sprocket assembly 10 including a bicycle sprocket in accordance with a first embodiment is illustrated. The bicycle multiple sprocket assembly 10 is configured to engage with a bicycle chain C. In this embodiment, the bicycle multiple sprocket assembly 10 comprises twelve bicycle sprockets S1 to S12. The bicycle multiple sprocket assembly 10 has a rotational center axis A1. The bicycle multiple sprocket assembly 10 is rotatable about the rotational center axis A1 in a driving rotational direction D11 during the pedaling. The driving rotational direction D11 is defined along a circumferential direction D1 of the bicycle multiple sprocket assembly 10.

Figure 2:
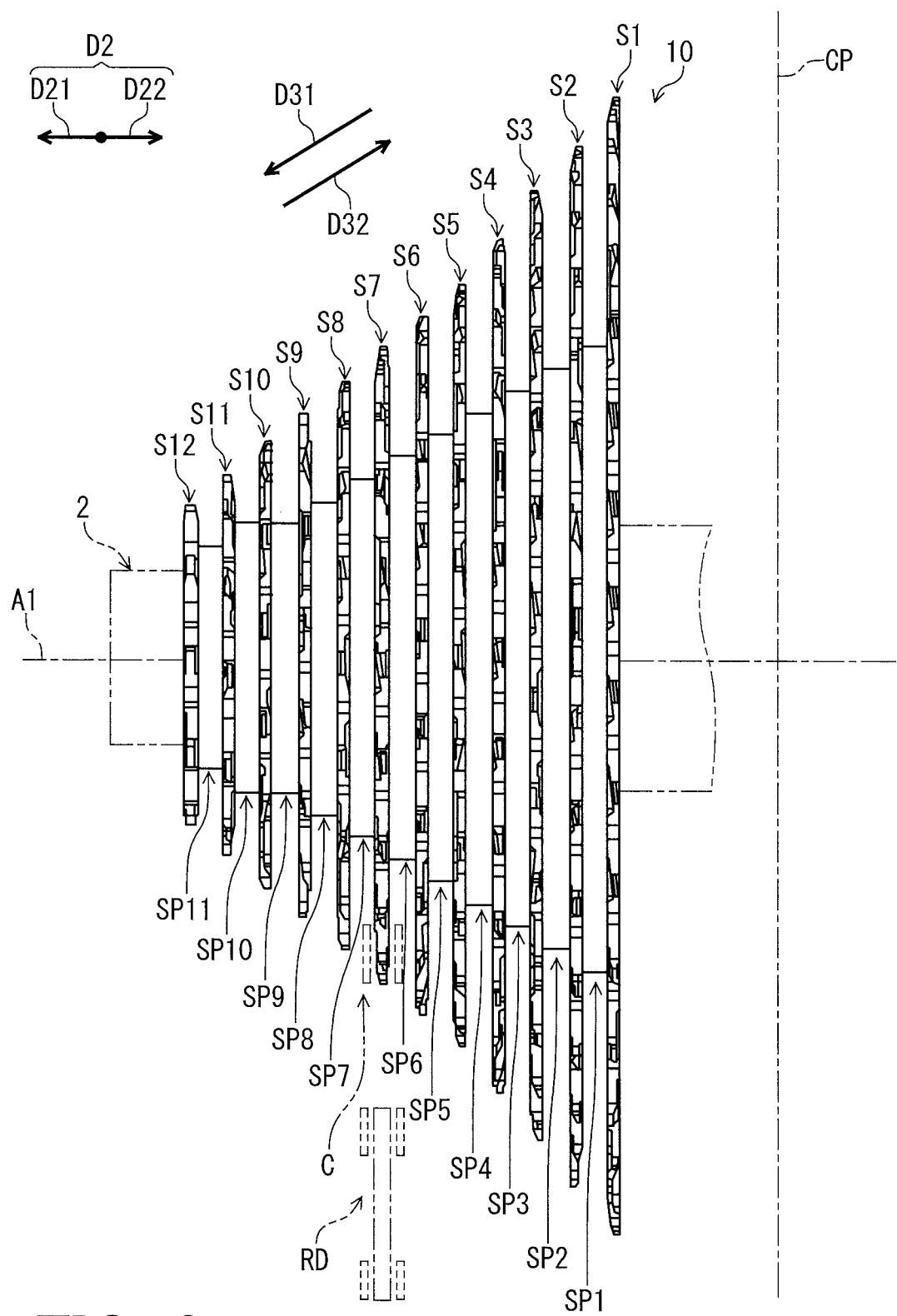
FIG. 2 is a front elevational view of the bicycle multiple sprocket assembly.

As seen in FIG. 1, the bicycle multiple sprocket assembly 10 further comprises a hub engagement structure 12 configured to engage with a bicycle hub assembly 2 (FIG. 2). While the bicycle multiple sprocket assembly 10 is a bicycle rear sprocket assembly in the illustrated embodiment, structures of the bicycle multiple sprocket assembly 10 can be applied to a front sprocket assembly if needed and/or desired. Each of the bicycle sprockets S1 to S12 is a bicycle rear sprocket in this embodiment, and the structures of the bicycle sprockets S1 to S12 can be applied to a bicycle front sprocket.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle (not shown) of a bicycle with facing a handlebar (not shown). Accordingly, these terms, as utilized to describe the bicycle multiple sprocket assembly 10, should be interpreted relative to the bicycle equipped with the bicycle multiple sprocket assembly 10 as used in an upright riding position on a horizontal surface.

As seen in FIG. 2, the bicycle sprockets S1 to S12 are arranged in an axial direction D2 parallel to the rotational center axis A1. The bicycle sprockets S1 to S12 are spaced apart from each other in the axial direction D2. The bicycle multiple sprocket assembly 10 includes spacers SP1 to SP11. Each of the spacers SP1 to SP11 is arranged between adjacent two sprockets of the bicycle sprockets S1 to S12. Instead of such spacers, a sprocket support member to which a plurality of bicycle sprockets are mounted can also be used.

The bicycle sprocket S1 has an outer diameter which is largest in the bicycle sprockets S1 to S12. The bicycle sprocket S12 has an outer diameter which is smallest in the bicycle sprockets S1 to S12. The bicycle sprocket S1 is closer to a bicycle center plane CP of a bicycle frame (not shown) than the bicycle sprocket S12 in a state where the bicycle multiple sprocket assembly 10 is mounted to the bicycle hub assembly 2. For example, upshifting occurs when the bicycle chain C is shifted by a rear derailleur RD from a larger sprocket to a neighboring smaller sprocket in an upshifting direction D31. Downshifting occurs when the bicycle chain C is shifted by the rear derailleur RD from a smaller sprocket to a neighboring larger sprocket in a downshifting direction D32. In the present application, upshifting operation and downshifting operation can be collectively referred to as shifting operation.

The bicycle sprocket S3 will be described in detail below. The bicycle sprockets S1, S2, and S4 to S12 have substantially the same structure as that of the bicycle sprocket S3. Thus, they will not be described in detail here for the sake of brevity.

Figure 3:
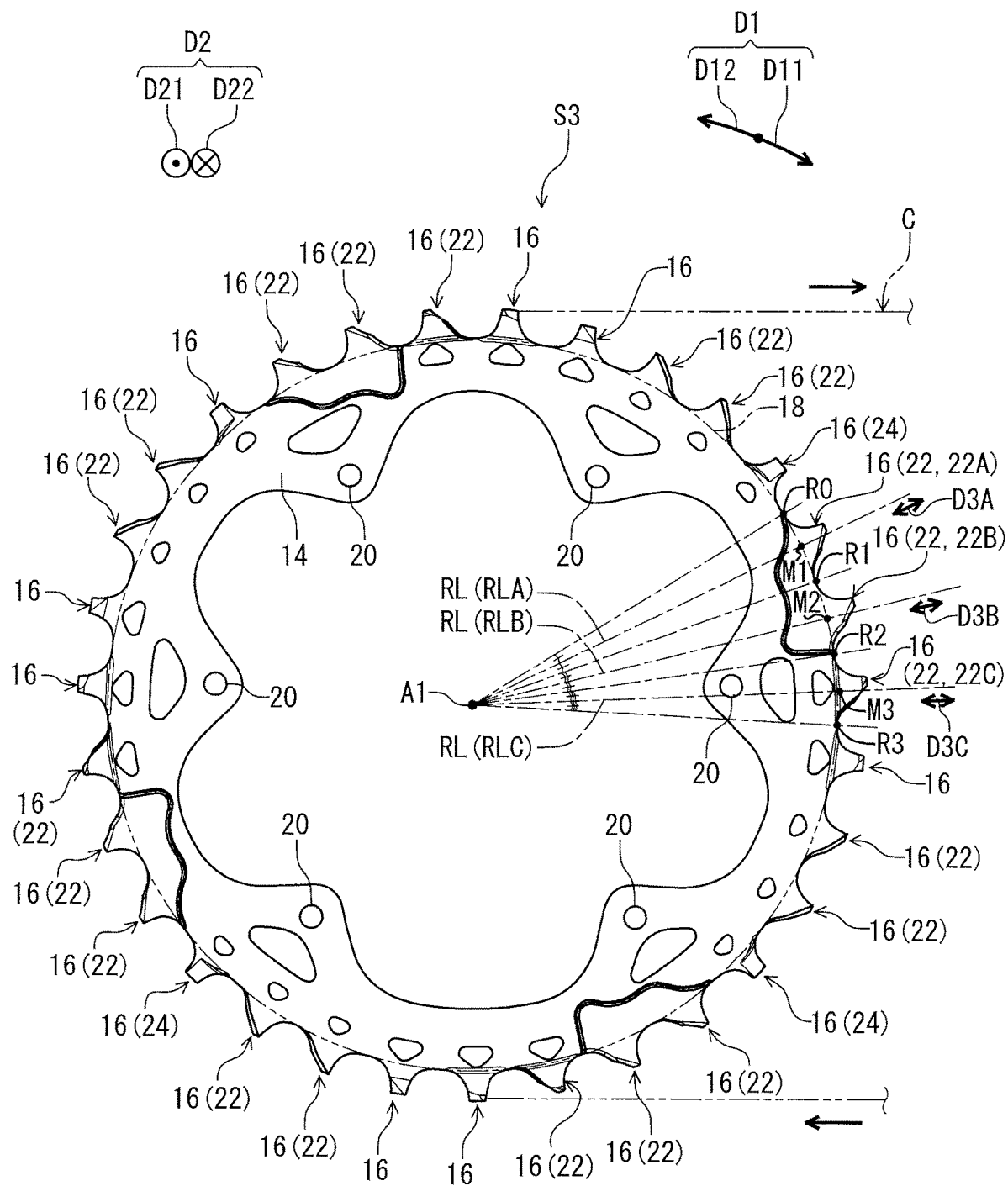
FIG. 3 is a side elevational view of the bicycle sprocket of the bicycle multiple sprocket assembly illustrated in FIG. 1.
Figure 4:
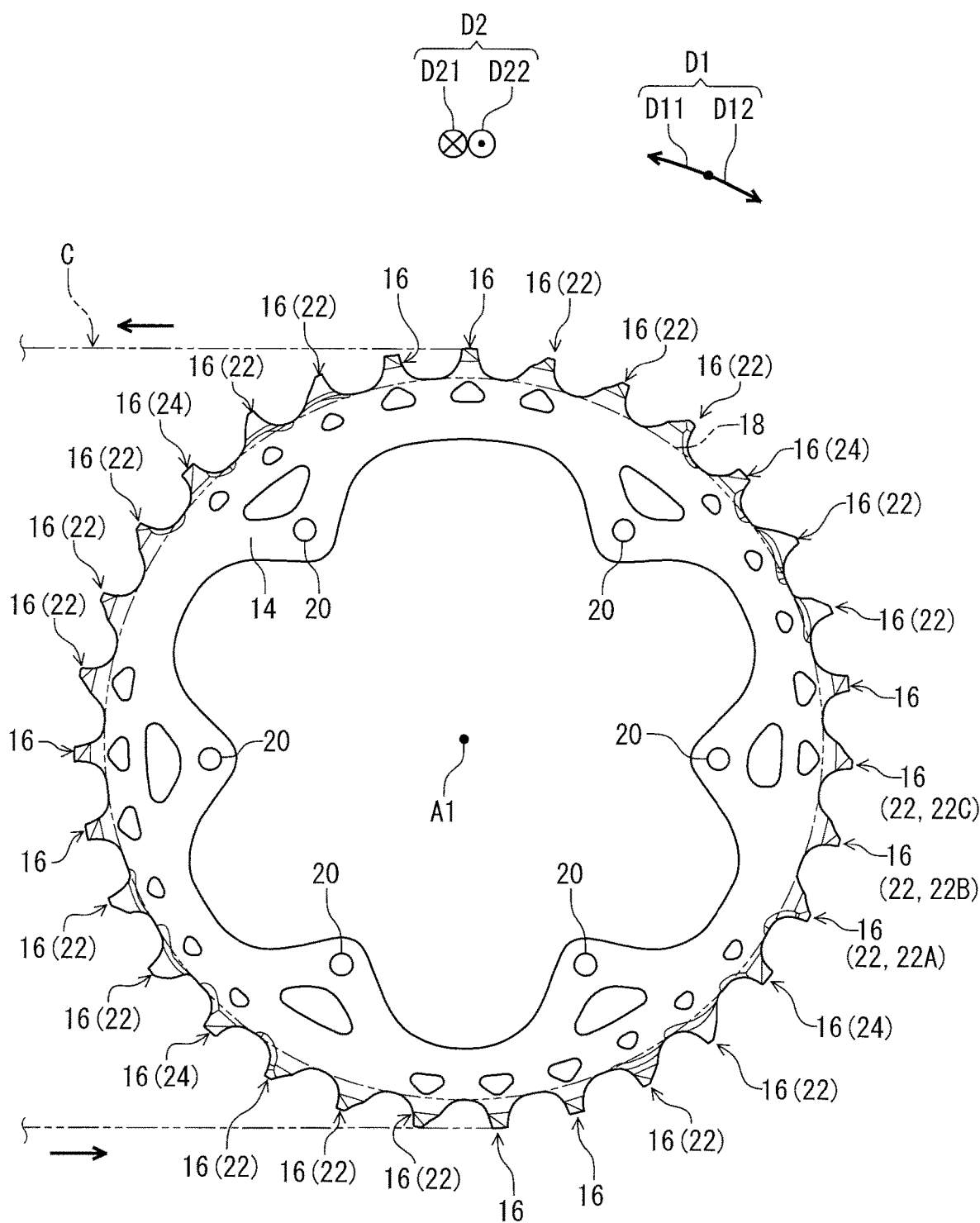
FIG. 4 is another side elevational view of the bicycle sprocket of the bicycle multiple sprocket assembly illustrated in FIG. 1.

As seen in FIGS. 3 and 4, the bicycle sprocket S3 comprises a sprocket body 14 and a plurality of sprocket teeth 16. The sprocket body 14 includes an outer periphery 18 provided about a rotational center axis A1 of the bicycle sprocket S3. The plurality of sprocket teeth 16 are provided on the outer periphery 18 of the sprocket body 14. The plurality of sprocket teeth 16 are configured to engage with the bicycle chain C. The sprocket body 14 is configured to be rotatable about the rotational center axis A1. The plurality of sprocket teeth 16 extend radially outwardly from the outer periphery 18 of the sprocket body 14. The bicycle sprocket S3 includes an attachment portion 20. The bicycle sprocket S3 is mounted to the bicycle hub assembly 2 via a sprocket carrier (not shown).

As seen in FIGS. 3 and 4, the plurality of sprocket teeth 16 includes at least one first tooth 22. The at least one first tooth 22 is configured to avoid initially engaging with the bicycle chain C in the shifting operation. How to avoid initially engaging with the bicycle chain C in the shifting operation is described below. Further, the plurality of sprocket teeth 16 includes at least one second tooth 24. The at least one second tooth 24 is configured to initially engage with the bicycle chain C in the shifting operation. More specifically, the at least one second tooth 24 is configured to initially engage with the bicycle chain C in the downshifting operation. That is, the at least one second tooth 24 is configured to initially engage with the bicycle chain C in the shifting operation where the bicycle chain C shifts from an adjacent smaller bicycle sprocket S4 to the bicycle sprocket S3. The at least one second tooth 24 is disposed adjacent to the at least one first tooth 22 in the circumferential direction D1 with respect to the rotational center axis A1 of the bicycle sprocket S3. More specifically, the at least one second tooth 24 is disposed adjacent to the at least one first tooth 22 at a downstream side in the driving rotational direction D11 of the bicycle sprocket S3. The at least one second tooth 24 is disposed adjacent to the at least one first tooth 22 at an upstream side in the driving rotational direction D11 of the bicycle sprocket S3. In the illustrated embodiment, the at least one second tooth 24 is disposed adjacent to the at least one first tooth 22 at both the upstream side and the downstream side, but the at least one second tooth 24 can be disposed at either the upstream side or the downstream side.

FIGS. 5 to 10 are enlarged views illustrating one of the at least one second tooth 24 and at least one first tooth 22 (specifically, three first teeth 22) disposed adjacent to the one of the at least one second tooth 24 at the upstream side. For the sake of the description, in FIGS. 5 to 10, a first tooth 22A denotes a tooth of the three first teeth 22 which is closest to the one of the at least one second tooth 24 in the driving rotational direction D11. A first tooth 22B denotes a tooth of the three first teeth 22 which is second closest to the one of the at least one second tooth 24 in the driving rotational direction D11. A first tooth 22C denotes a tooth of the three first teeth 22 which is third closest to the one of the at least one second tooth 24 in the driving rotational direction D11. The at least one first tooth 22 disposed adjacent to the one of the at least one second tooth 24 at the downstream side has substantially the same structure as the three first teeth 22 has. Accordingly, the structure of the at least one first tooth 22 disposed adjacent to the one of the at least one second tooth 24 at the downstream side will not be described and/or illustrated again in detail here for the sake of brevity.

Figure 5:
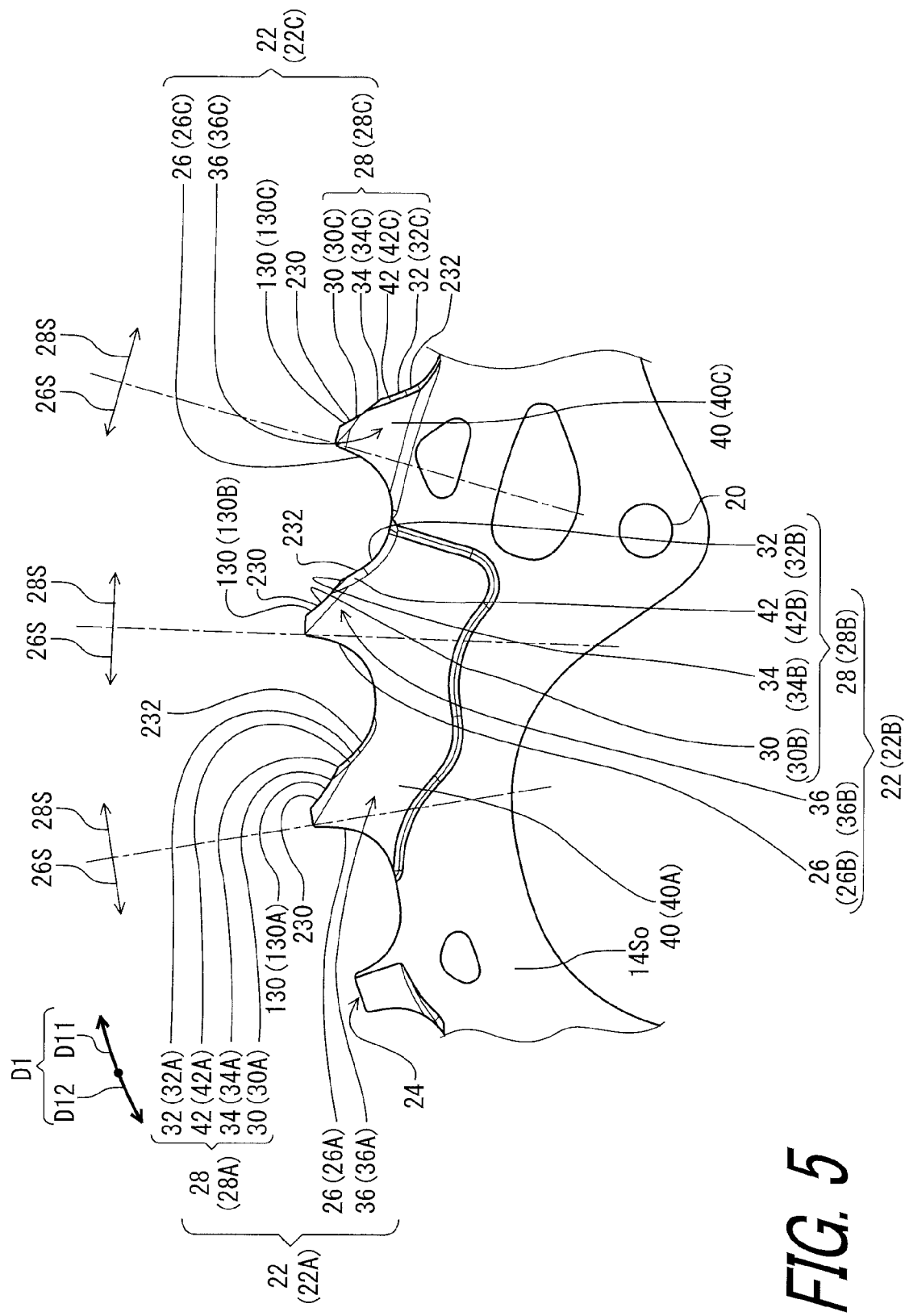
FIG. 5 is a partial side elevational view of the bicycle sprocket of the bicycle multiple sprocket assembly illustrated in FIG. 1.
Figure 6:
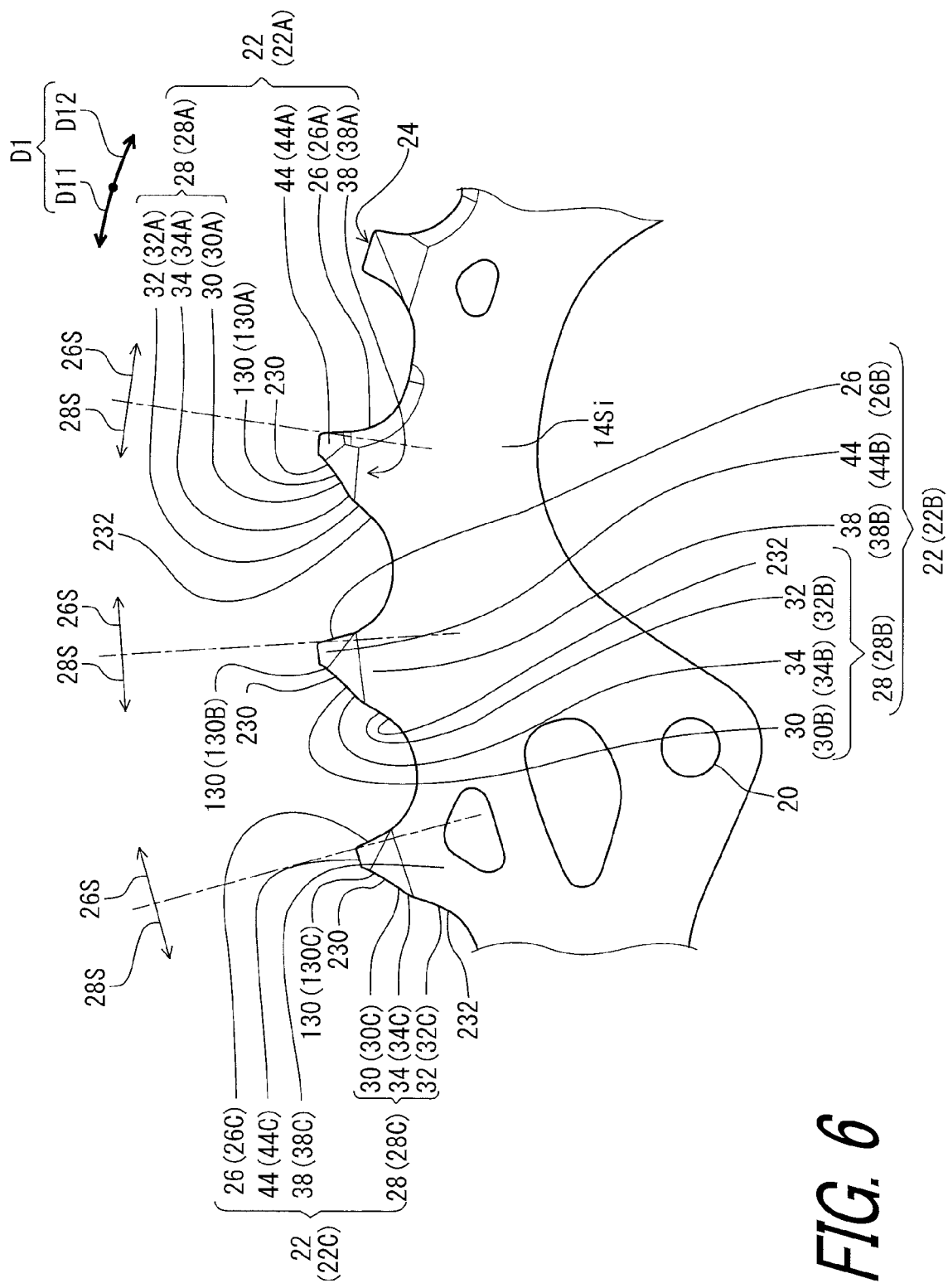
FIG. 6 is another partial side elevational view of the bicycle sprocket of the bicycle multiple sprocket assembly illustrated in FIG. 1.

As seen in FIGS. 5 to 10, the at least one first tooth 22 has a driving surface 26. The at least one first tooth 22 has a non-driving surface 28 opposite to the driving surface 26 in the circumferential direction D1 with respect to the rotational center axis A1 of the bicycle sprocket S3. The driving surface 26 faces in a reversing rotational direction D12 opposite to the driving rotational direction D11. The non-driving surface 28 faces in the driving rotational direction D11. As seen in FIGS. 5 and 6, the at least one first tooth 22 has a driving surface side 26S and a non-driving surface side 28S corresponding to the driving surface 26 and the non-driving surface 28, respectively. In FIGS. 5 to 10, driving surfaces 26A, 26B, and 26C denote driving surfaces 26 of the first teeth 22A, 22B, and 22C, respectively. Non-driving surfaces 28A, 28B, and 28C denote non-driving surfaces 28 of the first teeth 22A, 22B, and 22C, respectively.

In the illustrated embodiment, the at least one first tooth 22 has a bevel cut shape 130 in the non-driving surface side 28S. Accordingly, the non-driving surface 28 includes a first non-driving surface portion 30 and a second non-driving surface portion 32 so that a ridge 34 is formed between the first non-driving surface portion 30 and the second non-driving surface portion 32. The first non-driving surface portion 30 is disposed radially outwardly from the second non-driving surface portion 32. Ridges 34A, 34B, and 34C denote ridges 34 of the first teeth 22A, 22B, and 22C, respectively. First non-driving surface portions 30A, 30B, and 30C denote first non-driving surface portions 30 of the first teeth 22A, 22B, and 22C, respectively. Second non-driving surface portions 32A, 32B, and 32C denote second non-driving surface portions 32 of the first teeth 22A, 22B, and 22C, respectively.

Figure 7:
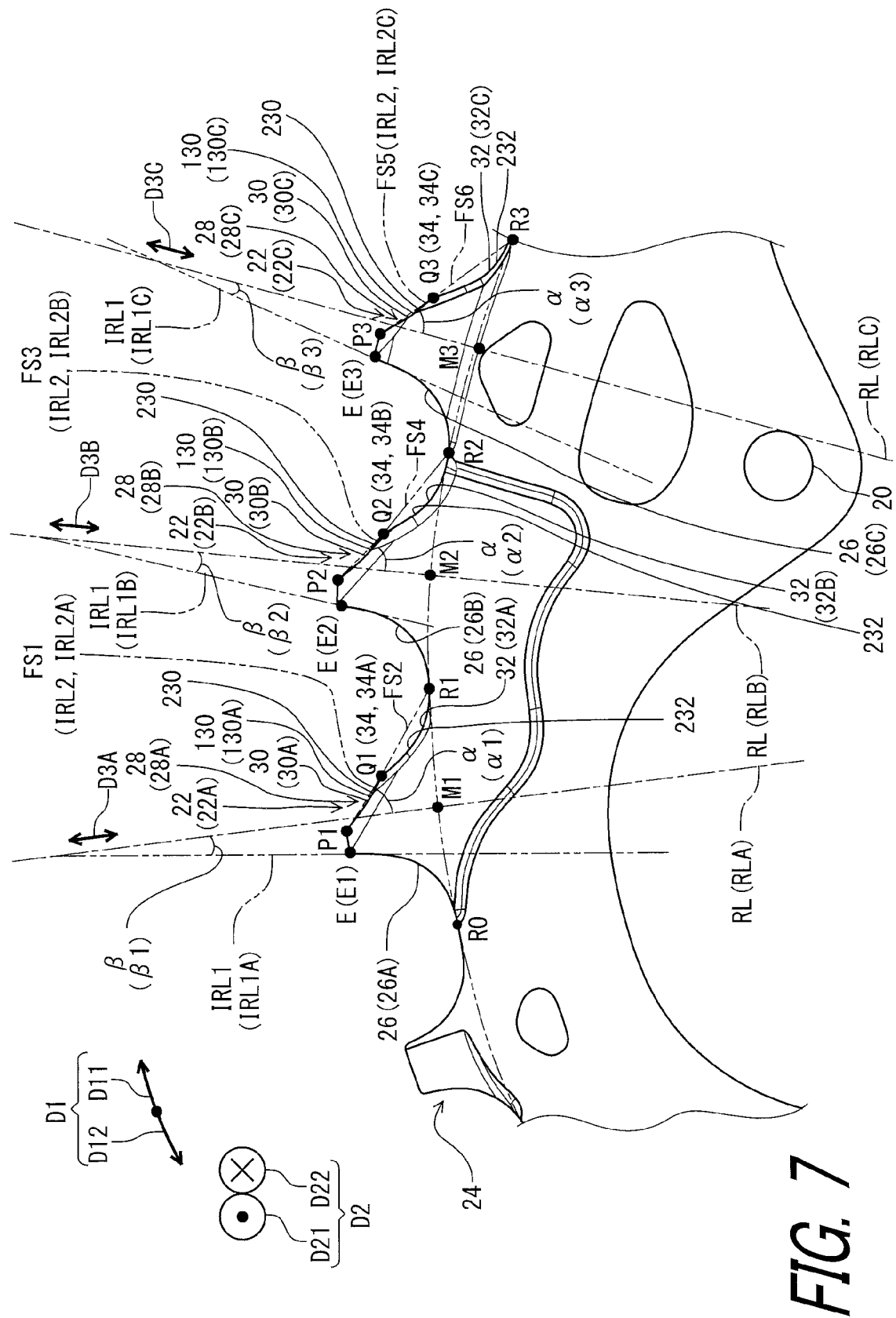
FIG. 7 is a drawing for which detailed shapes of a driving surface, a first non-driving surface portion, and a second non-driving surface portion are explained in the partial side elevational view illustrated in FIG. 5.

In the illustrated embodiment, the first non-driving surface portions 30A, 30B, and 30C, and second non-driving surface portions 32A, 32B, and 32C are concave curved surfaces. Accordingly, the at least one first tooth 22 has a non-driving surface 28 including a concave curved surface 230 or 232. In addition, the at least one first tooth 22 has a non-driving surface 28 including a plurality of concave curved surfaces 230 and 232. A concave curved surface means a surface concave from a flat surface connecting a radially outer edge of the surface with respect to the rotational center axis A1 and a radially inner edge of the surface with respect to the rotational center axis A1. For example, as seen in FIG. 7, the first non-driving surface portion 30A includes a radially outer edge P1 with respect to the rotational center axis A1 and a radially inner edge Q1 with respect to the rotational center axis A1, which is the ridge 34A. The second non-driving surface portion 32A includes a radially inner edge R1 with respect to the rotational center axis A1 and a radially outer edge Q1 with respect to the rotational center axis A1, which is the ridge 34A. The first non-driving surface portion 30A is concave from a flat surface FS1 connecting the radially outer edge P1 and the radially inner edge Q1. The second non-driving surface portion 32A is concave from a flat surface FS2 connecting the radially inner edge R1 and the radially outer edge Q1. Similarly, the first non-driving surface portion 30B is concave from a flat surface FS3 connecting a radially outer edge P2 and a radially inner edge Q2 which have substantially the same features as the radially outer edge P1 and the radially inner edge Q1, respectively. The second non-driving surface portion 32B is concave from a flat surface FS4 connecting a radially inner edge R2 and a radially outer edge Q2 which have substantially the same features as the radially inner edge R1 and the radially outer edge Q1, respectively. The first non-driving surface portion 30C is concave from a flat surface FS5 connecting a radially outer edge P3 and a radially inner edge Q3 which have substantially the same features as the radially outer edge P1 and the radially inner edge Q1, respectively. The second non-driving surface portion 32C is concave from a flat surface FS6 connecting a radially inner edge R3 and a radially outer edge Q3 which have substantially the same features as the radially inner edge R1 and the radially outer edge Q1, respectively.

In the illustrated embodiments, all of the first non-driving surface portions 30A, 30B, and 30C, and second non-driving surface portions 32A, 32B, and 32C are concave curved surfaces. However, some or all of the first non-driving surface portions 30 and the second non-driving surface portions 32 can be flat surfaces. Accordingly, a ridge 34 can be a boundary between two concave curved surfaces, a boundary between two flat surfaces, or a boundary between a concave curved surface and a flat surface. Further, in the illustrated embodiment, the bevel cut shape 130 extends from a radially outermost edge (e.g. P1, P2, P3) of the non-driving surface 28 to a middle (e.g. Q1, Q2, Q3) of the non-driving surface 28. But the bevel cut shape 130 can extend from the radially outermost edge to a radially innermost edge (e.g. R1, R2, R3) of the non-driving surface 28. In this case, the non-driving surface 28 can include a single concave curved surface.

As seen in FIGS. 3 and 7, shapes of the driving surface 26 and the non-driving surface 28 are defined with respect to a reference line RL. Reference lines RLA, RLB, and RLC denote reference lines RL of the first teeth 22A, 22B, and 22C, respectively. The reference line RL extends in a radial direction with respect to the rotational center axis A1 of the bicycle sprocket S3 to pass through the rotational center axis A1. For example, the reference line RLA extends in the radial direction D3A. The reference line RLB extends in the radial direction D3B. The reference line RLC extends in the radial direction D3C.

The reference line RL extends from a tooth center (e.g. M1, M2, M3) of the at least one first tooth 22 in the circumferential direction D1 to the rotational center axis A1 of the bicycle sprocket S3 such that the reference line RL is perpendicular to the rotational center axis A1. For example, the tooth center M1 of the first tooth 22A is in the middle of two distal ends R0 and R1 of the first tooth 22A in the circumferential direction D1. The distal end R0 is an intersection of the outer periphery 18 (a root circle 18) and the driving surface 26A of the first tooth 22A. The distal end R1 is an intersection of the root circle 18 of the sprocket body 14 and the non-driving surface 28A of the first tooth 22A. As shown in FIG. 3, an angle R0A1M1 is substantially equal to an angle M1A1R1. The tooth center M2 of the first tooth 22B is in the middle of two distal ends R1 and R2 of the first tooth 22B in the circumferential direction D1. The distal end R1 is an intersection of the root circle 18 and the driving surface 26B of the first tooth 22B as well as the intersection of the root circle 18 and the non-driving surface 28A of the first tooth 22A. The distal end R2 is an intersection of the root circle 18 and the non-driving surface 28B of the first tooth 22B. As shown in FIG. 3, an angle R1A1M2 is substantially equal to an angle M2A1R2. The tooth center M3 of the first tooth 22C is in the middle of two distal ends R2 and R3 of the first tooth 22C in the circumferential direction D1. The distal end R2 is an intersection of the root circle 18 and the driving surface 26C of the first tooth 22C as well as the intersection of the root circle 18 and the non-driving surface 28B of the first tooth 22B. The distal end R3 is an intersection of the root circle 18 and the non-driving surface 28C of the first tooth 22C. As shown in FIG. 3, an angle R2A1M3 is substantially equal to an angle M3A1R3. The reference line RLA passes through the tooth center M1 and the rotational center axis A1 of the bicycle sprocket S3 such that the reference line RLA is perpendicular to the rotational center axis A1. The reference line RLB passes through the tooth center M2 and the rotational center axis A1 of the bicycle sprocket S3 such that the reference line RLB is perpendicular to the rotational center axis A1. The reference line RLC passes through the tooth center M3 and the rotational center axis A1 of the bicycle sprocket S3 such that the reference line RLC is perpendicular to the rotational center axis A1.

When the non-driving surface is composed of a single concave curved surface, the shape of the non-driving surface 28 can be defined by the reference line RL and a non-driving side inclination reference line tangent to an intersection of the non-driving surface 28 and a plane perpendicular to the rotational center axis A1 of the bicycle sprocket S3 at a radially outermost edge (e.g. P1, P2, P3) of the non-driving surface 28. However, when the non-driving surface 28 is composed of two concave curved surfaces as illustrated in FIG. 7, the shape of the non-driving surface 28 can be defined by the reference line RL and a non-driving side inclination reference line IRL2 which connects the radially outer edge (e.g. P1, P2, P3) and the radially inner edge (e.g. Q1, Q2, Q3) of the first non-driving surface portion 30. That is, the non-driving side inclination reference line IRL2 is defined on the first non-driving surface portion 30. Non-driving side inclination reference lines IRL2A, IRL2B, and IRL2C denote non-driving side inclination reference lines IRL2 of the first teeth 22A, 22B, and 22C, respectively. In the below description, an angle made by the reference line RL and the non-driving side inclination reference line IRL2 is referred to as a first angle α. First angles α1, α2, and α3 denote first angles α of the first teeth 22A, 22B, and 22C, respectively.

The driving surface 26 is a concave curved surface between a distal end (e.g. R0, R1, R2) of the driving surface 26 and a radially outermost edge E of the driving surface 26. As a tangent point on an intersection of the driving surface 26 and a plane perpendicular to the rotational center axis A1 of the bicycle sprocket S3 approaches the radially outermost edge E of the driving surface 26, an angle made by the reference line RL and a line tangent to the intersection of the driving surface 26 and the plane perpendicular to the rotational center axis A1 at the tangent point becomes smaller. Accordingly, the shape of the driving surface 26 can be defined by the reference line RL and a driving side inclination reference line IRL1. As seen in FIG. 7, the driving side inclination reference line IRL1 is a line tangent to the intersection of the driving surface 26 and the plane perpendicular to the rotational center axis A1 of the bicycle sprocket S3 at the radially outermost edge E of the driving surface 26. Radially outermost edges E1, E2, and E3 denote radially outermost edges E of the first teeth 22A, 22B, and 22C, respectively. Driving side inclination reference lines IRL1A, IRL1B, and IRL1C denote driving side inclination reference lines IRL1 of the first teeth 22A, 22B, and 22C, respectively. In the below description, an angle made by the reference line RL and the driving side inclination reference line IRL1 is referred to as a second angle β. Second angles β1, β2, and β3 denote second angles β of the first teeth 22A, 22B, and 22C, respectively.

In this embodiment, the first angle α is larger than 36 degrees. That is, the first angles α1, α2, and α3 are larger than 36 degrees. The second angle β made by the reference line RL and the driving side inclination reference line IRL1 defined on the driving surface 26 is larger than 8 degrees. That is, the second angles β1, β2, and β3 are larger than 8 degrees.

Figure 8:
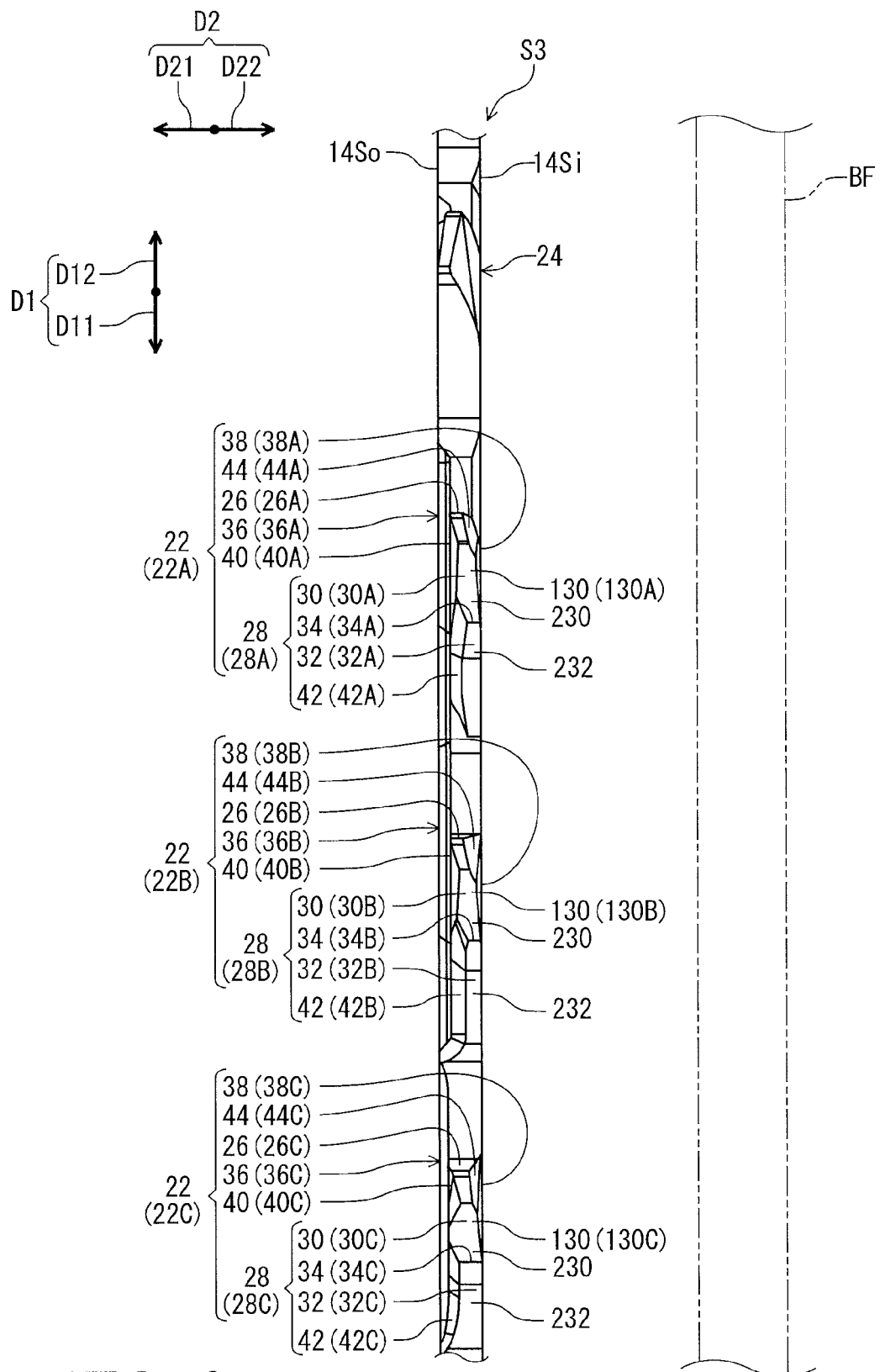
FIG. 8 is a partial plan view of the bicycle sprocket of the bicycle multiple sprocket assembly illustrated in FIG. 1.

As seen in FIGS. 5, 6, and 8, the at least one first tooth 22 has a bicycle outboard surface 36 and a bicycle inboard surface 38 opposite to the bicycle outboard surface 36 in the axial direction D2 with respect to the rotational center axis A1. As seen in FIG. 8, the bicycle inboard surface 38 faces a bicycle frame BF. In other words, the bicycle inboard surface 38 faces in an inward direction D22 along the rotational center axis A1, and bicycle outboard surface 36 faces in an outward direction D21 opposite to the inward direction D22 along the rotational center axis A1. The driving surface 26 and the non-driving surface 28 are disposed between the bicycle outboard surface 36 and the bicycle inboard surface 38 in the axial direction D2. Bicycle outboard surfaces 36A, 36B, and 36C denote bicycle outboard surfaces 36 of the first teeth 22A, 22B, and 22C, respectively. Bicycle inboard surfaces 38A, 38B, and 38C denote bicycle inboard surfaces 38 of the first teeth 22A, 22B, and 22C, respectively.

Figure 9:
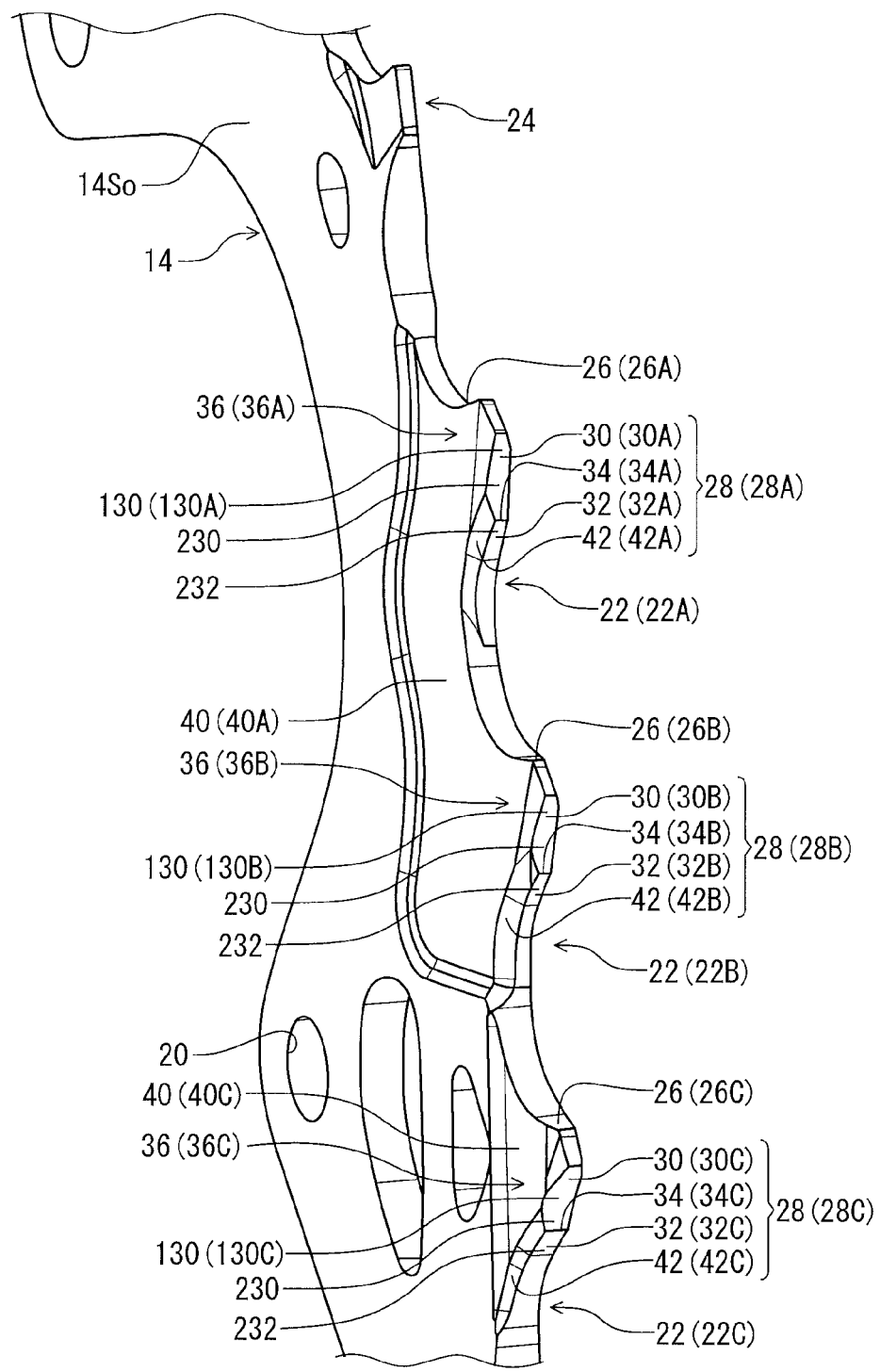
FIG. 9 is a partial perspective view of the bicycle sprocket of the bicycle multiple sprocket assembly illustrated in FIG. 1.

As seen in FIGS. 5, 8, and 9, the at least one first tooth 22 has an axial recess 40 in the bicycle outboard surface 36. Specifically, the first teeth 22A and 22B have an axial recess 40A. The first tooth 22C has an axial recess 40C. The axial recesses 40A and 40C are recessed from a sprocket body outboard surface 14So of the sprocket body 14. As seen in FIG. 8, the sprocket body outboard surface 14So is opposite to a sprocket body inboard surface 14Si of the sprocket body 14 which faces a bicycle frame BF. The axial recess 40 (each of the axial recesses 40A and 40C) facilitates downshifting when a rider performs a downshifting operation.

Further, the non-driving surface 28 has an outboard chamfer 42 adjacent to at least one of the first non-driving surface portion 30 and the second non-driving surface portion 32. More specifically, the outboard chamfer 42 is provided between the bicycle outboard surface 36 and at least one of the first non-driving surface portion 30 and the second non-driving surface portion 32. The outboard chamfer 42 is composed of a flat surface, but it may be composed of a curved surface. Outboard chamfers 42A, 42B, and 42C denote outboard chamfers 42 of the first teeth 22A, 22B, and 22C, respectively. The outboard chamfers 42A, 42B, and 42C facilitate dropping the bicycle chain C from the first teeth 22A, 22B, and 22C. In the illustrated embodiment, the outboard chamfer 42 is provided between the bicycle outboard surface 36 and the first non-driving surface portion 30 and between the bicycle outboard surface 36 and the second non-driving surface portion 32. However, even if the outboard chamfer 42 is disposed adjacent to the second non-driving surface portion 32 and the outboard chamfer 42 is not disposed adjacent to the first non-driving surface portion 30, the outboard chamfers 42A, 42B, and 42C can facilitate dropping the bicycle chain C from the first teeth 22A, 22B, and 22C.

Figure 10:
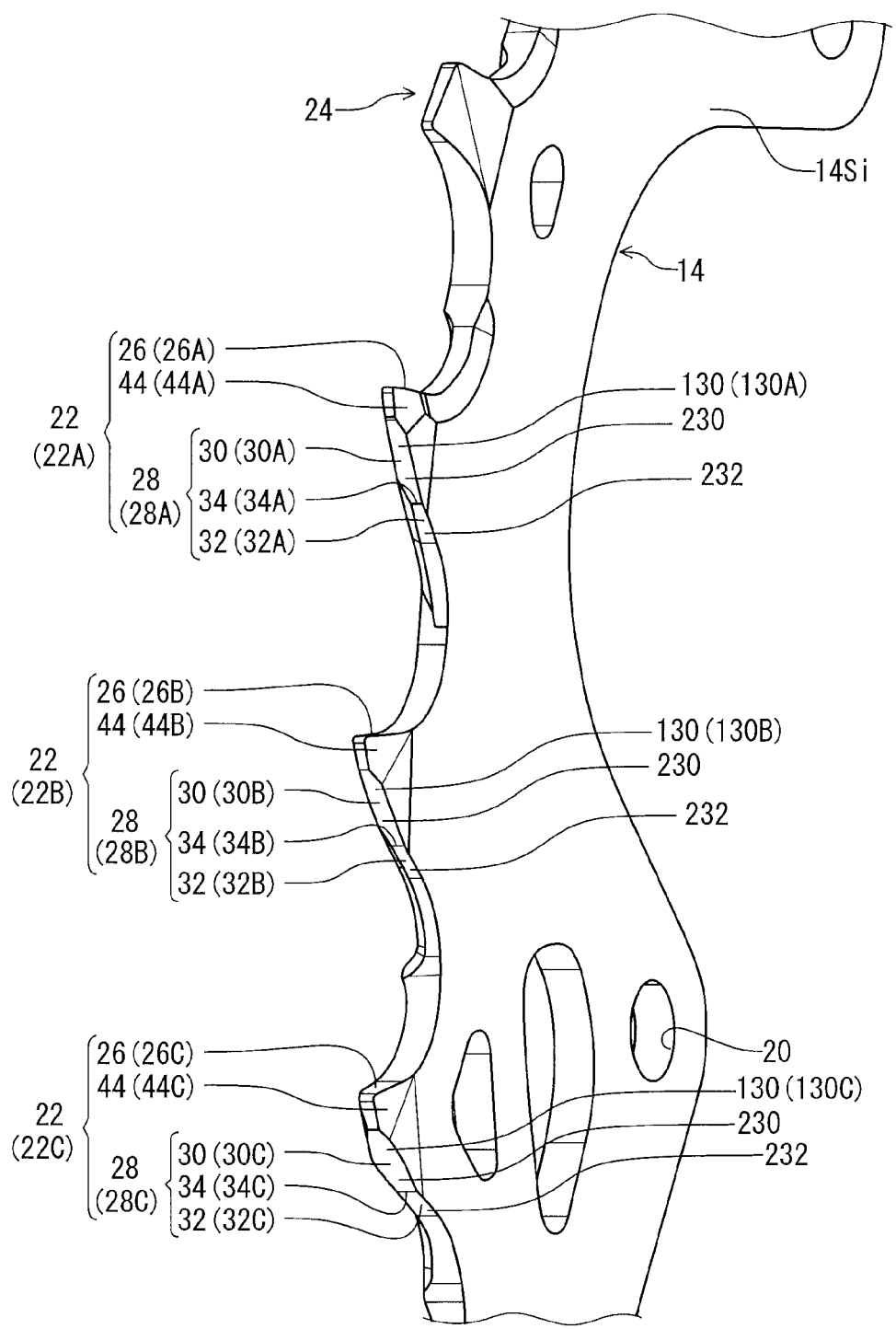
FIG. 10 is another partial perspective view of the bicycle sprocket of the bicycle multiple sprocket assembly illustrated in FIG. 1.

As seen in FIGS. 6, 8, and 10, the at least one first tooth 22 has an inboard chamfer 44 in the bicycle inboard surface 38. As seen in FIG. 8, the inboard chamfer 44 is provided between the driving surface 26 and the first non-driving surface portion 30 in the circumferential direction D1. The inboard chamfer 44 is composed of a flat surface, but it may be composed of a curved surface. Inboard chamfers 44A, 44B, and 44C denote inboard chamfers 44 of the first teeth 22A, 22B, and 22C, respectively. The inboard chamfer 44 facilitates a downshifting operation when the rider performs the downshifting operation.

Figure 11:
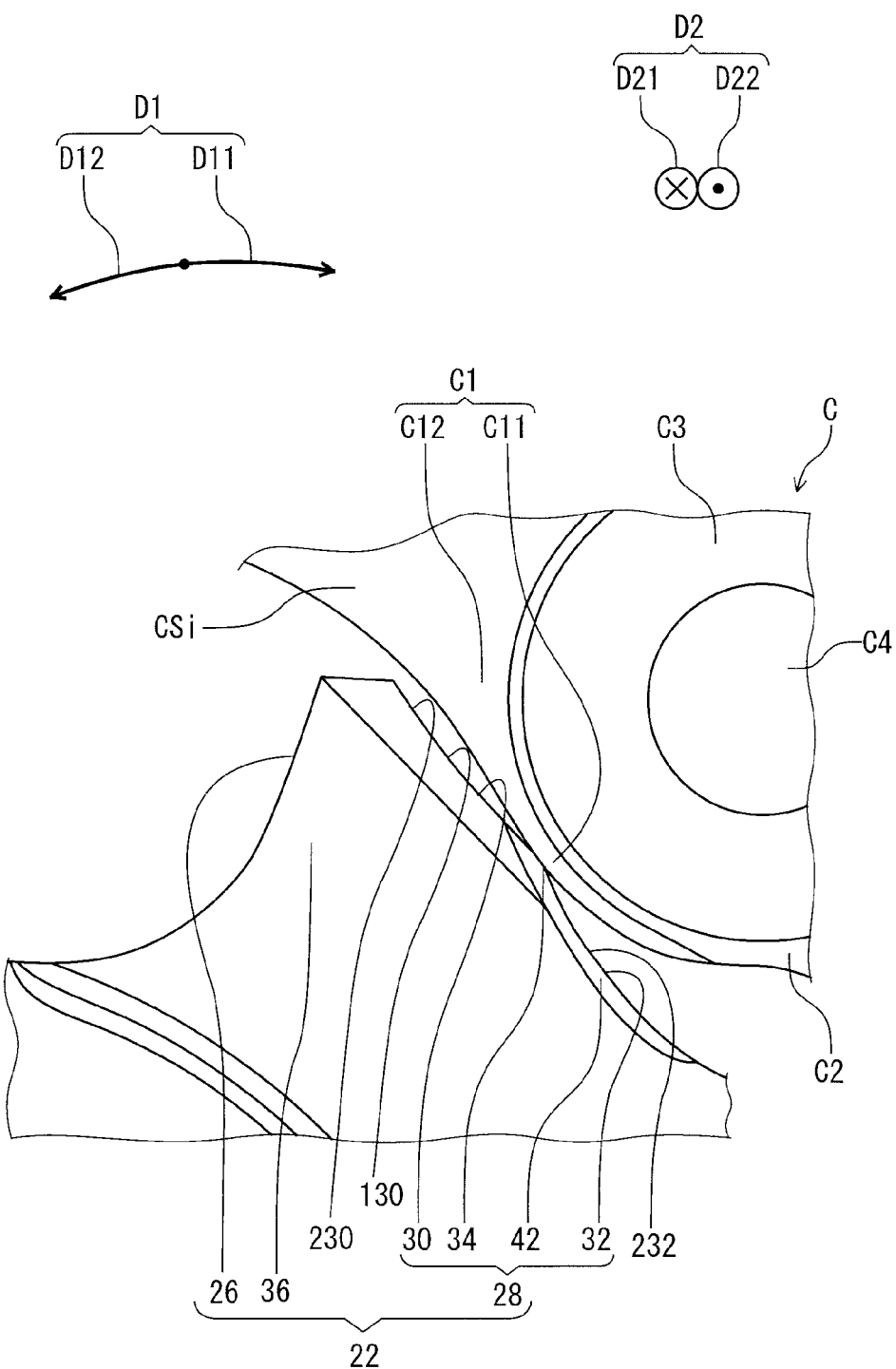
FIG. 11 is a partial side elevational view of the bicycle sprocket for showing a bevel cut effect.
Figure 12:
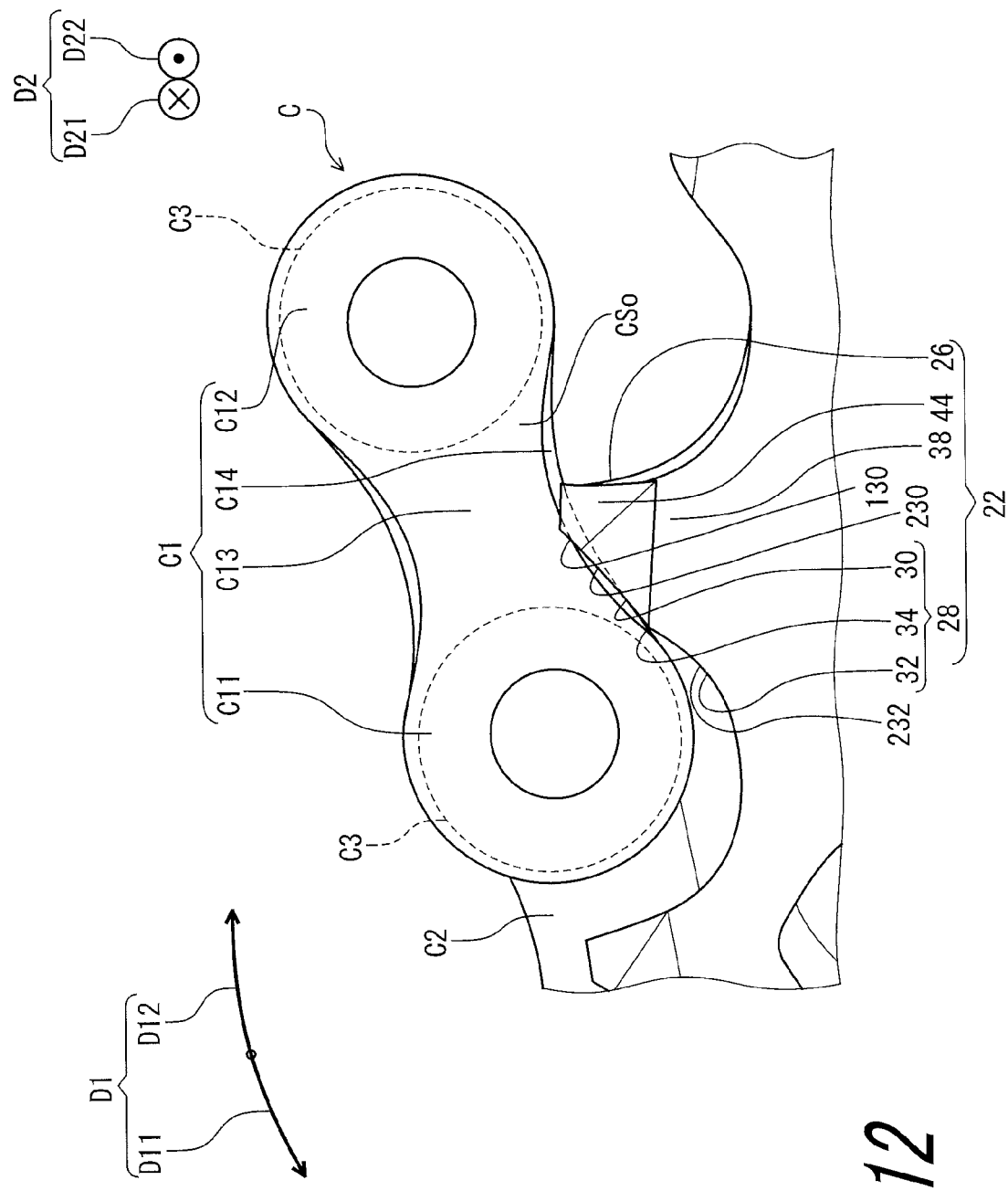
FIG. 12 is another partial side elevational view of the bicycle sprocket for showing a bevel cut effect.

As the at least one first tooth 22 has an aforementioned shape, the bevel cut shape 130 is configured to avoid initially engaging with the bicycle chain C in a shifting operation where the bicycle chain C shifts from the adjacent smaller bicycle sprocket S4 to the bicycle sprocket S3 (in an unintentional downshifting chain movement). The reason why the bevel cut shape 130 can avoid initially engaging with the bicycle chain C is described hereinafter with referring to FIGS. 11 to 15. As seen in FIG. 11, the bicycle chain C includes a bicycle outer link plate C1, a bicycle inner link plate C2, a roller C3, and a link pin C4. In FIG. 11, another bicycle outer link plate opposite to the bicycle outer link plate C1 in the axial direction D2 and another bicycle inner link plate opposite to the bicycle inner link plate C2 are omitted for convenience of explanation. As seen FIG. 12, the bicycle outer link plate C1 include a first end C11, a second end C12, and an intermediate portion C13 between the first end C11 and the second end C12. As seen in FIG. 11, the bicycle outer link plate C1 has an axially inner surface CSi facing in the outward direction D21 (the axially inner surface of the bicycle chain C means a surface facing the inside of the bicycle chain C). As seen in FIG. 12, the bicycle outer link plate C1 has an axially outer surface CSo facing in the inward direction D22 (the axially outer surface of the bicycle chain C means a surface facing the outside of the bicycle chain C). The bicycle outer link plate C1 further has a chamfer C14 provided on an outer periphery of the intermediate portion C13.

As seen in FIG. 11, the first end C11 of the bicycle outer link plate C1 of the bicycle chain C is likely to run on the ridge 34 and/or the outboard chamfer 42 when the bicycle chain C is about to shift from the adjacent smaller bicycle sprocket S4 to the bicycle sprocket S3 while a rider does not perform a downshifting operation. Then, the first end C11 slips on the ridge 34 and/or the outboard chamfer 42 in the outward direction D21 to drop from the at least one first tooth 22. Accordingly, the bevel cut shape 130 and the outboard chamfer 42 cause the at least one first tooth 22 to avoid initially engaging with the bicycle chain C in a shifting operation where the bicycle chain C shifts from the adjacent smaller bicycle sprocket S4 to the bicycle sprocket S3.

Since the first end C11 slips on the ridge 34 and/or the outboard chamfer 42 in the outward direction D21 to drop from the at least one first tooth 22, the non-driving surface 28 is to contact with the axially outer surface CSo of the bicycle outer link plate C1 of the bicycle chain C before the at least one first tooth 22 contacts the axially inner surface CSi of the bicycle outer link plate C1 in the shifting operation, which is illustrated in FIG. 12. More specifically, as seen in FIG. 12, the non-driving surface 28 is to contact with the chamfer C14 of the bicycle outer link plate C1.

Figure 13:
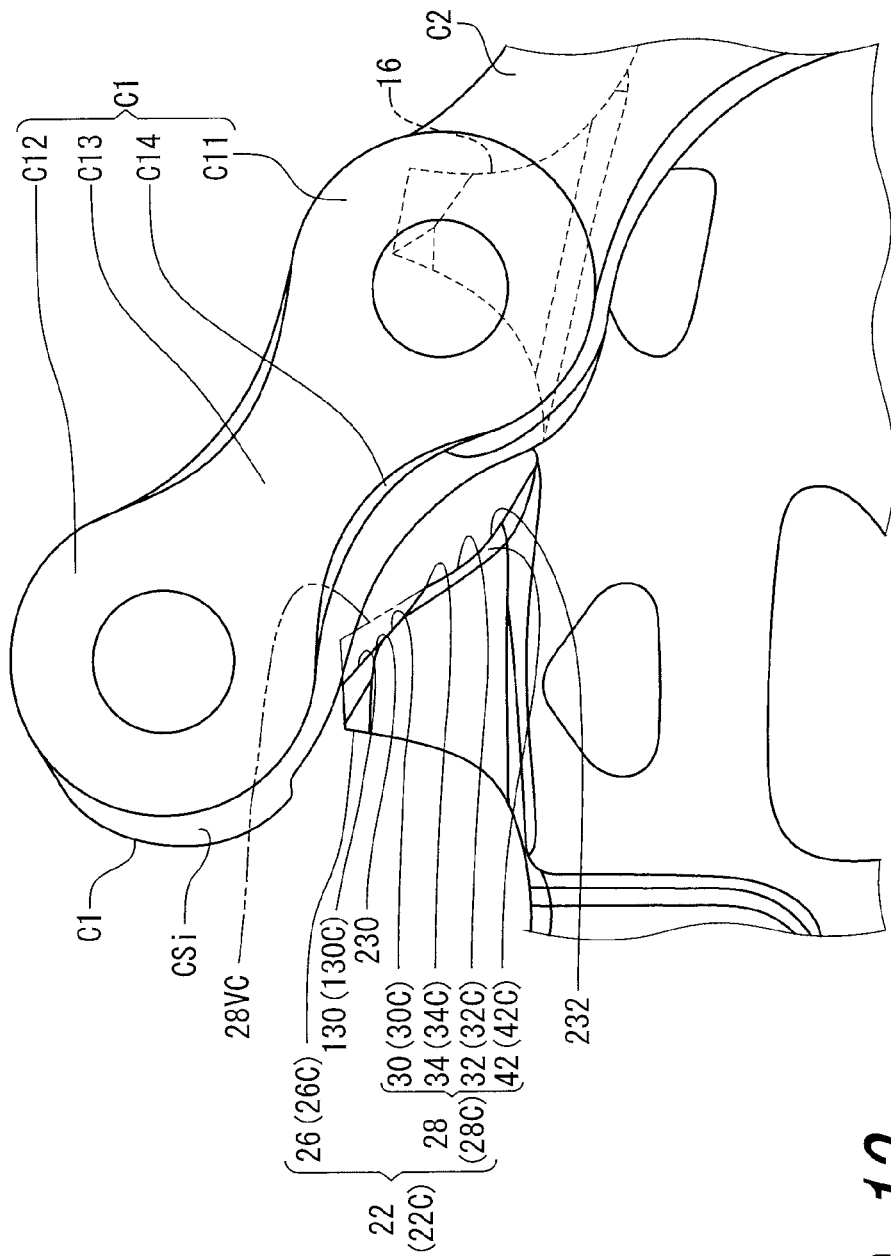
FIG. 13 is a partial side elevational view of the bicycle sprocket for showing a bevel cut effect.
Figure 14:
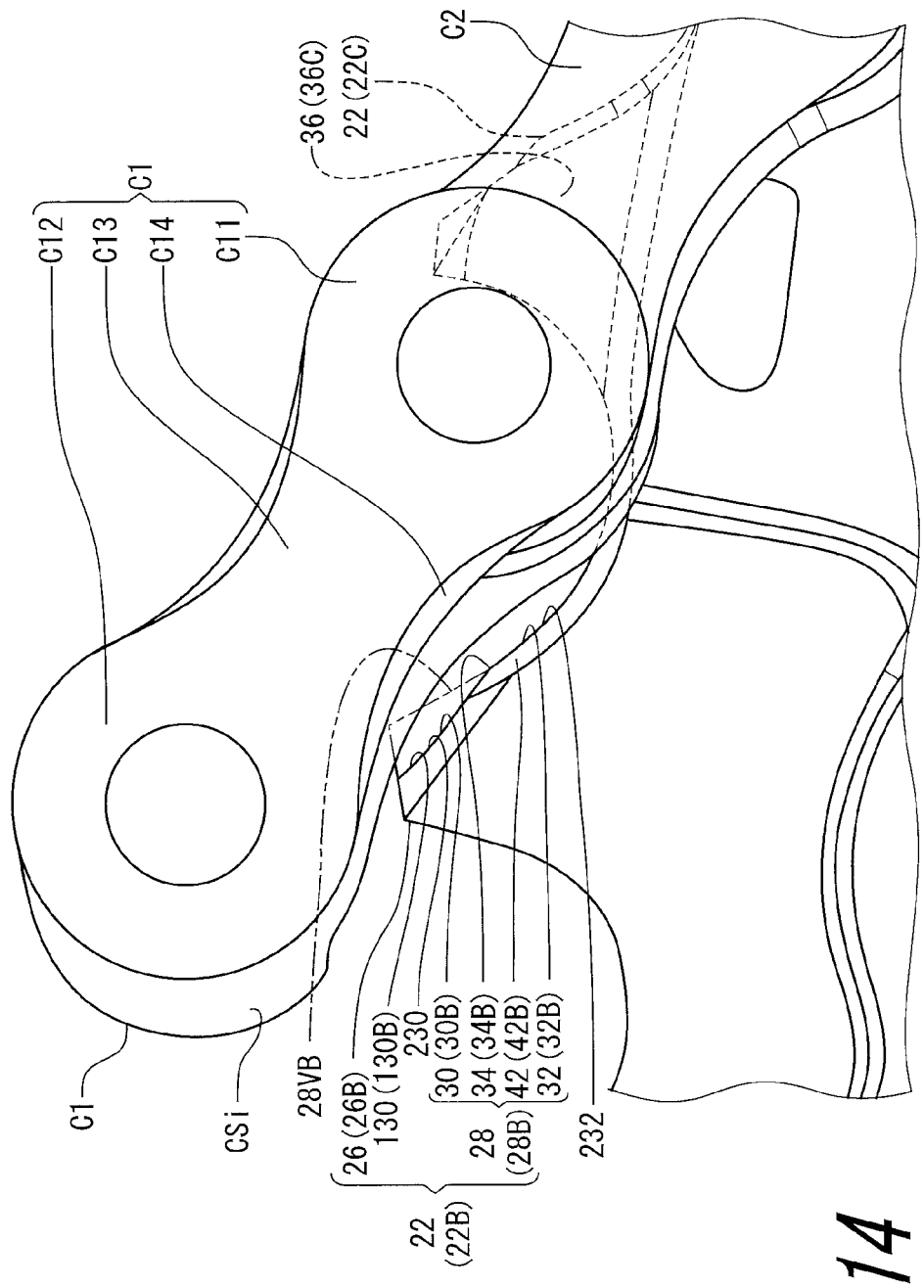
FIG. 14 is a partial side elevational view of the bicycle sprocket for showing a bevel cut effect.
Figure 15:
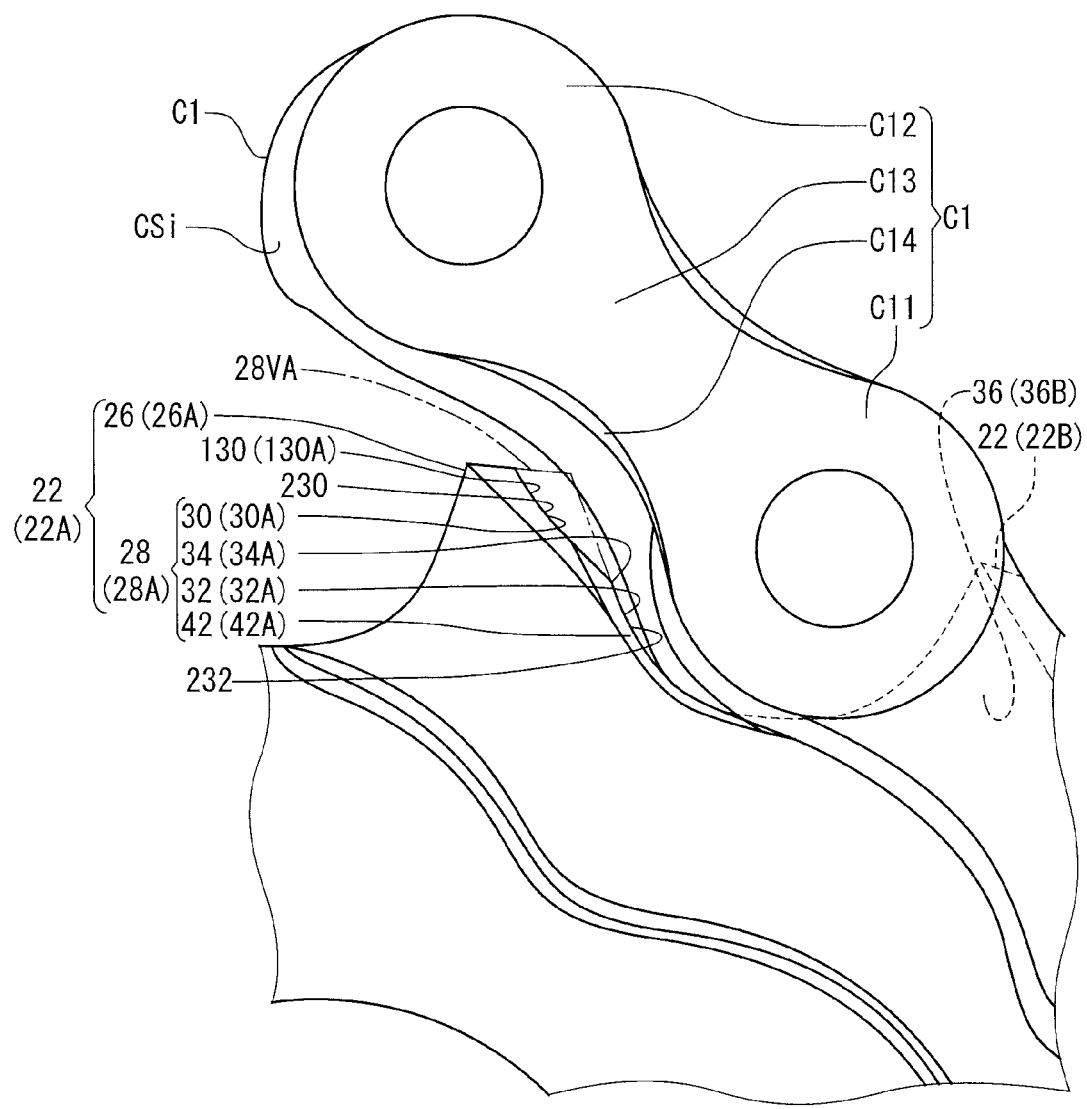
FIG. 15 is a partial side elevational view of the bicycle sprocket for showing a bevel cut effect.

FIGS. 13 to 15 show another advantage of the bevel cut shape 130. As seen in FIG. 13, the bevel cut shape 130C causes the bicycle chain C to contact a bicycle outboard surface of one of the sprocket teeth 16, before the first tooth 22C contacts the bicycle chain C. Accordingly, the non-driving surface 28C contacts the axially outer surface CSo (See FIG. 12) of the bicycle outer link plate C1 of the bicycle chain C after the bicycle chain C contacts the bicycle outboard surface of the one of the sprocket teeth 16. A two-dot chain line 28VC shows a shape of the non-driving surface 28C in case there is no bevel cut shape 130C in the first tooth 22C. If there is no bevel cut shape 130C in the first tooth 22C, the first tooth 22C may contact the axially inner surface CSi of the bicycle outer link plate C1 in the shifting operation without the bicycle chain C contacting the bicycle outboard surface of the one of the sprocket teeth 16, thereby the first tooth 22C initially engages with the bicycle chain C in the unintentional downshifting chain movement.

As seen in FIG. 14, the bevel cut shape 130B causes the bicycle chain C to contact the bicycle outboard surface 36C of the first tooth 22C, before the first tooth 22B contacts the bicycle chain C. Accordingly, the non-driving surface 28B contacts the axially outer surface CSo (See FIG. 12) of the bicycle outer link plate C1 of the bicycle chain C after the bicycle chain C contacts the bicycle outboard surface 36C of the first tooth 22C. A two-dot chain line 28VB shows a shape of the non-driving surface 28B in case there is no bevel cut shape 130B in the first tooth 22B. If there is no bevel cut shape 130B in the first tooth 22B, the first tooth 22B may contact the axially inner surface CSi of the bicycle outer link plate C1 in the shifting operation without the bicycle chain C contacting the bicycle outboard surface 36C of the first tooth 22C, thereby the first tooth 22B initially engages with the bicycle chain C in the unintentional downshifting chain movement.

As seen in FIG. 15, the bevel cut shape 130A causes the bicycle chain C to contact the bicycle outboard surface 36B of the first tooth 22B, before the first tooth 22A contacts the bicycle chain C. Accordingly, the non-driving surface 28A contacts the axially outer surface CSo (See FIG. 12) of the bicycle outer link plate C1 of the bicycle chain C after the bicycle chain C contacts the bicycle outboard surface 36B of the first tooth 22B. A two-dot chain line 28VA shows a shape of the non-driving surface 28A in case there is no bevel cut shape 130A in the first tooth 22A. If there is no bevel cut shape 130A in the first tooth 22A, the first tooth 22A may contact the axially inner surface CSi of the bicycle outer link plate C1 in the shifting operation without the bicycle chain C contacting the bicycle outboard surface 36B of the first tooth 22B, thereby the first tooth 22A initially engages with the bicycle chain C in the unintentional downshifting chain movement.

According to the above features as illustrated in FIGS. 13 to 15, the non-driving surface 28 (including the bevel cut shape 130) is to contact with the axially outer surface CSo of the bicycle outer link plate C1 of the bicycle chain C before the at least one first tooth 22 contacts the axially inner surface CSi of the bicycle outer link plate C1 in the shifting operation. Therefore, the bevel cut shape 130 is configured to avoid initially engaging with the bicycle chain C in a shifting operation where the bicycle chain C shifts from the adjacent smaller bicycle sprocket S4 to the bicycle sprocket S3.

With the bicycle sprocket S3, the at least one first tooth 22 has the bevel cut shape 130 in the non-driving surface side 28S. The bevel cut shape 130 is configured to avoid initially engaging with the bicycle chain C in the shifting operation where the bicycle chain C shifts from the adjacent smaller bicycle sprocket S4 to the bicycle sprocket S3. The at least one second tooth 24 is configured to initially engage with the bicycle chain C in the shifting operation. The at least one second tooth 24 is disposed adjacent to the at least one first tooth 22 in the circumferential direction D1 with respect to the rotational center axis A1 of the bicycle sprocket S3. Accordingly, it is possible to prevent the bicycle chain C from shifting from the adjacent smaller bicycle sprocket S4 to the bicycle sprocket S3 when a rider does not perform a downshifting operation (prevent the unintentional downshifting chain movement).

Further, the non-driving surface 28 includes the first non-driving surface portion 30 and the second non-driving surface portion 32 so that the ridge 34 is formed between the first non-driving surface portion 30 and the second non-driving surface portion 32. Accordingly, the roller C3 of the bicycle chain C can run on the ridge 34 before the at least one first tooth 22 contacts the chamfer C14 of the link plate C1 of the bicycle chain C to prevent the unintentional downshifting chain movement as well as to maintain strength of the at least one first tooth 22. In addition, it restrains the bicycle chain C from being worn out.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
a sprocket body; and
a plurality of sprocket teeth provided on an outer periphery of the sprocket body, the plurality of sprocket teeth including:
at least one first tooth having a driving surface side and a non-driving surface side, the at least one first tooth having a bevel cut shape in the non-driving surface side, the bevel cut shape being configured to avoid initially engaging with a bicycle chain in a shifting operation where the bicycle chain shifts from an adjacent smaller bicycle sprocket to the bicycle sprocket; and
at least one second tooth configured to initially engage with the bicycle chain in the shifting operation, the at least one second tooth is disposed adjacent to the at least one first tooth in a circumferential direction with respect to a rotational center axis of the bicycle sprocket, wherein
the bevel cut shape is a surface portion that extends in an axial direction parallel to rotational center axis, the surface portion is a concave curved surface when viewed in the axial direction.

2. The bicycle sprocket according to claim 1, wherein
the at least one first tooth has a non-driving surface to contact with an axially outer surface of a bicycle outer link plate of the bicycle chain to avoid engaging with the bicycle chain before the at least one first tooth contacts an axially inner surface of the bicycle outer link plate in the shifting operation.

3. The bicycle sprocket according to claim 1, wherein
the at least one first tooth has a bicycle outboard surface and a bicycle inboard surface opposite to the bicycle outboard surface in the axial direction with respect to the rotational center axis,
the bicycle inboard surface faces a bicycle frame, and
the at least one first tooth has an axial recess in the bicycle outboard surface.

4. The bicycle sprocket according to claim 1, wherein
the at least one first tooth is configured to avoid initially engaging with the bicycle chain in the shifting operation.

5. The bicycle sprocket according to claim 1, wherein
the at least one second tooth is disposed adjacent to the at least one first tooth at a downstream side in a driving rotational direction of the bicycle sprocket.

6. The bicycle sprocket according to claim 1, wherein
the at least one second tooth is disposed adjacent to the at least one first tooth at an upstream side in a driving rotational direction of the bicycle sprocket.

7. The bicycle sprocket according to claim 1, wherein
the at least one first tooth has a bicycle outboard surface and a bicycle inboard surface opposite to the bicycle outboard surface in the axial direction with respect to the rotational center axis,
the bicycle inboard surface faces a bicycle frame, and
the at least one first tooth has an inboard chamfer in the bicycle inboard surface.

8. The bicycle sprocket according to claim 1, wherein
the at least one first tooth has a non-driving surface including a concave curved surface.

9. A bicycle sprocket comprising:
a sprocket body; and
a plurality of sprocket teeth provided on an outer periphery of the sprocket body, the plurality of sprocket teeth including:
at least one first tooth having a driving surface and a non-driving surface opposite to the driving surface in a circumferential direction with respect to a rotational center axis of the bicycle sprocket, the driving surface extending in the circumferential direction from a first radially outermost edge with respect to the rotational center axis to a distal end that is connected to a root circle of the bicycle sprocket, the non-driving surface including a first non-driving surface portion and a second non-driving surface portion so that a ridge is formed between the first non-driving surface portion and the second non-driving surface portion, the first non-driving surface portion extending in the circumferential direction from the ridge to a second radially outermost edge with respect to the rotational center axis, the second radially outermost edge being different from the first radially outermost edge; and
at least one second tooth configured to initially engage with the bicycle chain in a shifting operation where the bicycle chain shifts from an adjacent smaller bicycle sprocket to the bicycle sprocket, the at least one second tooth is disposed adjacent to the at least one first tooth in the circumferential direction,
wherein the first radially outermost edge of the driving surface is a radially outermost edge of the at least one first tooth.

10. The bicycle sprocket according to claim 9, wherein
the at least one first tooth has a bicycle outboard surface and a bicycle inboard surface opposite to the bicycle outboard surface in an axial direction with respect to the rotational center axis,
the bicycle inboard surface faces a bicycle frame, and
the at least one first tooth has an axial recess in the bicycle outboard surface.

11. The bicycle sprocket according to claim 9, wherein
the first non-driving surface portion is disposed radially outwardly from the second non-driving surface portion, and
the non-driving surface has an outboard chamfer adjacent to at least one of the first non-driving surface portion and the second non-driving surface portion.

12. The bicycle sprocket according to claim 11, wherein
the outboard chamfer is disposed adjacent to the second non-driving surface portion.

13. The bicycle sprocket according to claim 11, wherein
at least one first tooth further has a bicycle outboard surface and a bicycle inboard surface opposite to the bicycle outboard surface in an axial direction with respect to the rotational center axis,
the driving surface and the non-driving surface are disposed between the bicycle outboard surface and the bicycle inboard surface in the axial direction,
the outboard chamfer is provided between the bicycle outboard surface and at least one of the first non-driving surface portion and the second non-driving surface portion.

14. The bicycle sprocket according to claim 9, wherein
the at least one first tooth is configured to avoid initially engaging with the bicycle chain in the shifting operation.

15. The bicycle sprocket according to claim 9, wherein
the at least one second tooth is disposed adjacent to the at least one first tooth at a downstream side in a driving rotational direction of the bicycle sprocket.

16. The bicycle sprocket according to claim 9, wherein
the at least one second tooth is disposed adjacent to the at least one first tooth at an upstream side in a driving rotational direction of the bicycle sprocket.

17. The bicycle sprocket according to claim 9, wherein
the at least one first tooth has a bicycle outboard surface and a bicycle inboard surface opposite to the bicycle outboard surface in an axial direction with respect to the rotational center axis, the bicycle inboard surface facing a bicycle frame, and
the at least one first tooth has an inboard chamfer in the bicycle inboard surface.

18. A bicycle sprocket comprising:
a sprocket body; and
a plurality of sprocket teeth provided on an outer periphery of the sprocket body, the plurality of sprocket teeth including:
   at least one first tooth each of which has a driving surface, a non-driving surface opposite to the driving surface in a circumferential direction with respect to a rotational center axis of the bicycle sprocket, the driving surface extending in the circumferential direction from a first radially outermost edge with respect to the rotational center axis to a distal end that is connected to a root circle of the bicycle sprocket, the non-driving surface including a first non-driving surface portion and a second non-driving surface portion so that a ridge is formed between the first non-driving surface portion and the second non-driving surface portion, the first non-driving surface portion extending in the circumferential direction from the ridge to a second radially outermost edge with respect to the rotational center axis, the second radially outermost edge being different from the first radially outermost edge, a reference line extending in a radial direction with respect to the rotational center axis of the bicycle sprocket to pass through a tooth center of the at least one first tooth in the circumferential direction, and
a first angle made by the reference line and a non-driving side inclination reference line extending from the second radially outermost edge to the ridge being larger than 36 degrees,
wherein the first radially outermost edge of the driving surface is a radially outermost edge of the at least one first tooth.

19. The bicycle sprocket according to claim 18, wherein
a second angle made by the reference line and a driving side inclination reference line tangent to an intersection of the driving surface and a plane perpendicular to the rotational center axis being larger than 8 degrees.

20. The bicycle sprocket according to claim 18, wherein
the first non-driving surface portion is disposed radially outwardly from the second non-driving surface portion; and
the non-driving side inclination reference line is defined on the first non-driving surface portion.

21. The bicycle sprocket according to claim 18, wherein
the reference line is perpendicular to the rotational center axis.

\* \* \* \* \*